United States Patent
Warren

(10) Patent No.: US 7,829,624 B2
(45) Date of Patent: Nov. 9, 2010

(54) ONE-POT SYNTHESIS OF NANOPARTICLES AND LIQUID POLYMER FOR RUBBER APPLICATIONS

(75) Inventor: Sandra Warren, Gradignan (FR)

(73) Assignee: Bridgestone Corporation (JP)

( * ) Notice: Subject to any disclaimer, the term of this patent is extended or adjusted under 35 U.S.C. 154(b) by 642 days.

(21) Appl. No.: 11/771,659

(22) Filed: Jun. 29, 2007

(65) Prior Publication Data
US 2009/0005491 A1    Jan. 1, 2009

(51) Int. Cl.
B60C 1/00    (2006.01)
C08F 257/02    (2006.01)
C08F 279/02    (2006.01)
C08L 53/02    (2006.01)

(52) U.S. Cl. ......................... 524/505; 525/89
(58) Field of Classification Search ................. 524/505; 525/89
See application file for complete search history.

(56) References Cited

U.S. PATENT DOCUMENTS

| | | |
|---|---|---|
| 2,531,396 A | 11/1950 | Carter et al. |
| 3,598,884 A | 8/1971 | Wei et al. |
| 3,793,402 A | 2/1974 | Owens |
| 3,840,620 A | 10/1974 | Gallagher |
| 3,972,963 A | 8/1976 | Schwab et al. |
| 4,075,186 A | 2/1978 | Ambrose et al. |
| 4,233,409 A | 11/1980 | Bulkley |
| 4,247,434 A | 1/1981 | Vanderhoff et al. |
| 4,248,986 A | 2/1981 | Lal et al. |
| 4,326,008 A | 4/1982 | Rembaum |
| 4,386,125 A | 5/1983 | Shiraki et al. |
| 4,463,129 A | 7/1984 | Shinada et al. |
| 4,471,093 A | 9/1984 | Furukawa et al. |
| 4,543,403 A | 9/1985 | Isayama et al. |
| 4,598,105 A | 7/1986 | Weber et al. |
| 4,602,052 A | 7/1986 | Weber et al. |
| 4,659,790 A | 4/1987 | Shimozato et al. |
| 4,717,655 A | 1/1988 | Fulwyler |
| 4,725,522 A | 2/1988 | Breton et al. |
| 4,764,572 A | 8/1988 | Bean, Jr. |
| 4,773,521 A | 9/1988 | Chen |
| 4,774,189 A | 9/1988 | Schwartz |
| 4,788,254 A | 11/1988 | Kawakubo et al. |
| 4,829,130 A | 5/1989 | Licchelli et al. |
| 4,829,135 A | 5/1989 | Gunesin et al. |
| 4,837,274 A | 6/1989 | Kawakubo et al. |
| 4,837,401 A | 6/1989 | Hirose et al. |
| 4,861,131 A | 8/1989 | Bois et al. |
| 4,870,144 A | 9/1989 | Noda et al. |
| 4,871,814 A | 10/1989 | Gunesin et al. |
| 4,904,730 A | 2/1990 | Moore et al. |
| 4,904,732 A | 2/1990 | Iwahara et al. |
| 4,906,695 A | 3/1990 | Blizzard et al. |
| 4,920,160 A | 4/1990 | Chip et al. |
| 4,942,209 A | 7/1990 | Gunesin |
| 4,987,202 A | 1/1991 | Zeigler |
| 5,036,138 A | 7/1991 | Stamhuis et al. |
| 5,066,729 A | 11/1991 | Stayer, Jr. et al. |
| 5,073,498 A | 12/1991 | Schwartz et al. |
| 5,075,377 A | 12/1991 | Kawakubo et al. |
| 5,120,379 A | 6/1992 | Noda et al. |
| 5,130,377 A | 7/1992 | Trepka et al. |
| 5,169,914 A | 12/1992 | Kaszas et al. |
| 5,194,300 A | 3/1993 | Cheung |
| 5,219,945 A | 6/1993 | Dicker et al. |
| 5,227,419 A | 7/1993 | Moczygemba et al. |
| 5,237,015 A | 8/1993 | Urban |
| 5,241,008 A | 8/1993 | Hall |
| 5,247,021 A | 9/1993 | Fujisawa et al. |
| 5,256,736 A | 10/1993 | Trepka et al. |
| 5,262,502 A | 11/1993 | Fujisawa et al. |
| 5,290,873 A | 3/1994 | Noda et al. |
| 5,290,875 A | 3/1994 | Moczygemba et al. |
| 5,290,878 A | 3/1994 | Yamamoto et al. |
| 5,296,547 A | 3/1994 | Nestegard et al. |
| 5,329,005 A | 7/1994 | Lawson et al. |

(Continued)

FOREIGN PATENT DOCUMENTS

CA    2127919    3/1995

(Continued)

OTHER PUBLICATIONS

Chevalier, Alicia Ann, Nov. 25, 2009 Office Action from U.S. Appl. No. 10/886,283 [7 pp.].

(Continued)

Primary Examiner—Jeffrey C Mullis
(74) Attorney, Agent, or Firm—Meredith E. Hooker; Nathan Lewis

(57) ABSTRACT

A method for performing a one-batch synthesis of a blend of nanoparticles and liquid polymer includes polymerizing a first monomer and optionally a second monomer in a hydrocarbon solvent to form the liquid polymer. The polymerization is terminated before completion with a quenching agent. Then a charge of polymerization initiator, and a mixture of multiple-vinyl aromatic monomer and mono-vinyl aromatic monomer are added. This causes further polymerization whereby nanoparticles are formed in situ having a core including the multiple-vinyl aromatic monomer, and a shell including the first monomer or the first monomer and the second monomer. Liquid polymer/nanoparticle blends resulting from the method and rubber compositions incorporating the blends are also disclosed.

25 Claims, 2 Drawing Sheets

U.S. PATENT DOCUMENTS

| | | |
|---|---|---|
| 5,331,035 A | 7/1994 | Hall |
| 5,336,712 A | 8/1994 | Austgen, Jr. et al. |
| 5,362,794 A | 11/1994 | Inui et al. |
| 5,395,891 A | 3/1995 | Obrecht et al. |
| 5,395,902 A | 3/1995 | Hall |
| 5,399,628 A | 3/1995 | Moczygemba et al. |
| 5,399,629 A | 3/1995 | Coolbaugh et al. |
| 5,405,903 A | 4/1995 | Van Westrenen et al. |
| 5,421,866 A | 6/1995 | Stark-Kasley et al. |
| 5,436,298 A | 7/1995 | Moczygemba et al. |
| 5,438,103 A | 8/1995 | DePorter et al. |
| 5,447,990 A | 9/1995 | Noda et al. |
| 5,462,994 A | 10/1995 | Lo et al. |
| 5,514,734 A | 5/1996 | Maxfield et al. |
| 5,514,753 A | 5/1996 | Ozawa et al. |
| 5,521,309 A | 5/1996 | Antkowiak et al. |
| 5,525,639 A | 6/1996 | Keneko et al. |
| 5,527,870 A | 6/1996 | Maeda et al. |
| 5,530,052 A | 6/1996 | Takekoshi et al. |
| 5,580,925 A | 12/1996 | Iwahara et al. |
| 5,587,423 A | 12/1996 | Brandstetter et al. |
| 5,594,072 A | 1/1997 | Handlin, Jr. et al. |
| 5,614,579 A | 3/1997 | Roggeman et al. |
| 5,627,252 A | 5/1997 | De La Croi Habimana |
| 5,674,592 A | 10/1997 | Clark et al. |
| 5,686,528 A | 11/1997 | Wills et al. |
| 5,688,856 A | 11/1997 | Austgen, Jr. et al. |
| 5,707,439 A | 1/1998 | Takekoshi et al. |
| 5,728,791 A | 3/1998 | Tamai et al. |
| 5,733,975 A | 3/1998 | Aoyama et al. |
| 5,739,267 A | 4/1998 | Fujisawa et al. |
| 5,742,118 A | 4/1998 | Endo et al. |
| 5,747,152 A | 5/1998 | Oka et al. |
| 5,763,551 A | 6/1998 | Wunsch et al. |
| 5,773,521 A | 6/1998 | Hoxmeier et al. |
| 5,777,037 A | 7/1998 | Yamanaka et al. |
| 5,811,501 A | 9/1998 | Chiba et al. |
| 5,834,563 A | 11/1998 | Kimura et al. |
| 5,847,054 A | 12/1998 | McKee et al. |
| 5,849,847 A | 12/1998 | Quirk |
| 5,855,972 A | 1/1999 | Kaeding |
| 5,883,173 A | 3/1999 | Elspass et al. |
| 5,891,947 A | 4/1999 | Hall et al. |
| 5,905,116 A | 5/1999 | Wang et al. |
| 5,910,530 A | 6/1999 | Wang et al. |
| 5,955,537 A | 9/1999 | Steininger et al. |
| 5,986,010 A | 11/1999 | Clites et al. |
| 5,994,468 A | 11/1999 | Wang et al. |
| 6,011,116 A | 1/2000 | Aoyama et al. |
| 6,020,446 A | 2/2000 | Okamoto et al. |
| 6,025,416 A | 2/2000 | Proebster et al. |
| 6,025,445 A | 2/2000 | Chiba et al. |
| 6,060,549 A | 5/2000 | Li et al. |
| 6,060,559 A | 5/2000 | Feng et al. |
| 6,087,016 A | 7/2000 | Feeney et al. |
| 6,087,456 A | 7/2000 | Sakaguchi et al. |
| 6,106,953 A | 8/2000 | Zimmermann et al. |
| 6,117,932 A | 9/2000 | Hasegawa et al. |
| 6,121,379 A | 9/2000 | Yamanaka et al. |
| 6,127,488 A | 10/2000 | Obrecht et al. |
| 6,147,151 A | 11/2000 | Fukumoto et al. |
| 6,166,855 A | 12/2000 | Ikeyama et al. |
| 6,180,693 B1 | 1/2001 | Tang et al. |
| 6,191,217 B1 | 2/2001 | Wang et al. |
| 6,197,849 B1 | 3/2001 | Zilg et al. |
| 6,204,354 B1 | 3/2001 | Wang et al. |
| 6,207,263 B1 | 3/2001 | Takematsu et al. |
| 6,225,394 B1 | 5/2001 | Lan et al. |
| 6,252,014 B1 | 6/2001 | Knauss |
| 6,255,372 B1 | 7/2001 | Lin et al. |
| 6,268,451 B1 | 7/2001 | Faust et al. |
| 6,277,304 B1 | 8/2001 | Wei et al. |
| 6,348,546 B2 | 2/2002 | Hiiro et al. |
| 6,359,075 B1 | 3/2002 | Wollum et al. |
| 6,379,791 B1 | 4/2002 | Cernohous et al. |
| 6,383,500 B1 | 5/2002 | Wooley et al. |
| 6,395,829 B1 | 5/2002 | Miyamoto et al. |
| 6,420,486 B1 | 7/2002 | DePorter et al. |
| 6,437,050 B1 | 8/2002 | Krom et al. |
| 6,441,090 B1 | 8/2002 | Demirors et al. |
| 6,448,353 B1 | 9/2002 | Nelson et al. |
| 6,489,378 B1 | 12/2002 | Sosa et al. |
| 6,524,595 B1 | 2/2003 | Perrier et al. |
| 6,550,508 B1 | 4/2003 | Yamaguchi et al. |
| 6,573,313 B2 | 6/2003 | Li et al. |
| 6,573,330 B1 | 6/2003 | Fujikake et al. |
| 6,598,645 B1 | 7/2003 | Larson |
| 6,649,702 B1 | 11/2003 | Rapoport et al. |
| 6,663,960 B1 | 12/2003 | Murakami et al. |
| 6,689,469 B2 | 2/2004 | Wang et al. |
| 6,693,746 B1 | 2/2004 | Nakamura et al. |
| 6,706,813 B2 | 3/2004 | Chiba et al. |
| 6,706,823 B2 | 3/2004 | Wang et al. |
| 6,727,311 B2 | 4/2004 | Ajbani et al. |
| 6,737,486 B2 | 5/2004 | Wang |
| 6,750,297 B2 | 6/2004 | Yeu et al. |
| 6,759,464 B2 | 7/2004 | Ajbani et al. |
| 6,774,185 B2 | 8/2004 | Lin et al. |
| 6,777,500 B2 | 8/2004 | Lean et al. |
| 6,780,937 B2 | 8/2004 | Castner |
| 6,835,781 B2 | 12/2004 | Kondou et al. |
| 6,858,665 B2 | 2/2005 | Larson |
| 6,861,462 B2 | 3/2005 | Parker et al. |
| 6,872,785 B2 | 3/2005 | Wang et al. |
| 6,875,818 B2 | 4/2005 | Wang |
| 6,908,958 B2 | 6/2005 | Maruyama et al. |
| 6,956,084 B2 | 10/2005 | Wang et al. |
| 7,056,840 B2 | 6/2006 | Miller et al. |
| 7,071,246 B2 | 7/2006 | Xie et al. |
| 7,112,369 B2 | 9/2006 | Wang et al. |
| 7,179,864 B2 | 2/2007 | Wang |
| 7,193,004 B2 | 3/2007 | Weydert et al. |
| 7,205,370 B2 | 4/2007 | Wang et al. |
| 7,217,775 B2 | 5/2007 | Castner |
| 7,238,751 B2 | 7/2007 | Wang et al. |
| 7,244,783 B2 | 7/2007 | Lean et al. |
| 7,291,394 B2 | 11/2007 | Winkler et al. |
| 7,347,237 B2 | 3/2008 | Xie et al. |
| 7,408,005 B2 | 8/2008 | Zheng et al. |
| 2001/0053813 A1 | 12/2001 | Konno et al. |
| 2002/0007011 A1 | 1/2002 | Konno et al. |
| 2002/0045714 A1 | 4/2002 | Tomalia et al. |
| 2002/0095008 A1 | 7/2002 | Hemrich et al. |
| 2002/0144401 A1 | 10/2002 | Nogueroles Vines et al. |
| 2003/0004250 A1 | 1/2003 | Ajbani et al. |
| 2003/0032710 A1 | 2/2003 | Larson |
| 2003/0124353 A1 | 7/2003 | Wang et al. |
| 2003/0130401 A1 | 7/2003 | Lin et al. |
| 2003/0149185 A1 | 8/2003 | Wang et al. |
| 2003/0198810 A1 | 10/2003 | Wang et al. |
| 2003/0225190 A1 | 12/2003 | Borbely et al. |
| 2004/0033345 A1 | 2/2004 | Dubertret et al. |
| 2004/0059057 A1 | 3/2004 | Swisher et al. |
| 2004/0091546 A1 | 5/2004 | Johnson et al. |
| 2004/0127603 A1 | 7/2004 | Lean et al. |
| 2004/0143064 A1 | 7/2004 | Wang |
| 2004/0198917 A1 | 10/2004 | Castner |
| 2005/0101743 A1 | 5/2005 | Stacy et al. |
| 2005/0182158 A1 | 8/2005 | Ziser et al. |
| 2005/0192408 A1 | 9/2005 | Lin et al. |
| 2005/0197462 A1 | 9/2005 | Wang et al. |
| 2005/0203248 A1 | 9/2005 | Zheng et al. |
| 2005/0215693 A1 | 9/2005 | Wang et al. |
| 2005/0228072 A1 | 10/2005 | Winkler et al. |

| | | |
|---|---|---|
| 2005/0228074 A1 | 10/2005 | Wang et al. |
| 2005/0282956 A1 | 12/2005 | Bohm et al. |
| 2006/0084722 A1 | 4/2006 | Lin et al. |
| 2006/0173115 A1 | 8/2006 | Wang et al. |
| 2006/0173130 A1 | 8/2006 | Wang et al. |
| 2006/0235128 A1 | 10/2006 | Wang et al. |
| 2007/0027264 A1 | 2/2007 | Wang et al. |
| 2007/0135579 A1 | 6/2007 | Obrecht et al. |
| 2007/0142550 A1 | 6/2007 | Wang et al. |
| 2007/0142559 A1 | 6/2007 | Wang et al. |
| 2007/0149649 A1 | 6/2007 | Wang et al. |
| 2007/0161754 A1 | 7/2007 | Bohm et al. |
| 2007/0185273 A1 | 8/2007 | Hall et al. |
| 2007/0196653 A1 | 8/2007 | Hall et al. |
| 2008/0145660 A1 | 6/2008 | Wang et al. |
| 2008/0149238 A1 | 6/2008 | Kleckner et al. |
| 2008/0160305 A1 | 7/2008 | Warren et al. |
| 2008/0188579 A1 | 8/2008 | Wang et al. |
| 2008/0286374 A1 | 11/2008 | Wang et al. |
| 2008/0305336 A1 | 12/2008 | Wang et al. |
| 2009/0048390 A1 | 2/2009 | Wang et al. |
| 2009/0054554 A1 | 2/2009 | Wang et al. |
| 2009/0270558 A1 | 10/2009 | Gandon-pain et al. |
| 2010/0004398 A1 | 1/2010 | Wang et al. |
| 2010/0016472 A1 | 1/2010 | Wang et al. |
| 2010/0016512 A1 | 1/2010 | Wang et al. |

FOREIGN PATENT DOCUMENTS

| | | |
|---|---|---|
| DE | 3434983 | 4/1986 |
| DE | 4241538 | 6/1994 |
| EP | 0143500 | 6/1985 |
| EP | 0255170 | 2/1988 |
| EP | 0265142 | 4/1988 |
| EP | 0265145 | 4/1988 |
| EP | 0322905 | 7/1989 |
| EP | 0352042 | 1/1990 |
| EP | 0472344 | 2/1992 |
| EP | 0540942 | 5/1993 |
| EP | 0590491 | 4/1994 |
| EP | 0742268 | 11/1996 |
| EP | 1031605 | 8/2000 |
| EP | 1099728 | 5/2001 |
| EP | 1134251 | 9/2001 |
| EP | 1273616 | 6/2002 |
| EP | 1321489 | 6/2003 |
| EP | 1783168 | 5/2007 |
| FR | 2099645 | 3/1972 |
| JP | 01279943 | 11/1989 |
| JP | 2191619 | 7/1990 |
| JP | 2196893 | 8/1990 |
| JP | 05132605 | 5/1993 |
| JP | 06248017 | 9/1994 |
| JP | 7011043 | 1/1995 |
| JP | 08199062 | 8/1996 |
| JP | 2000-514791 | 11/2000 |
| JP | 2003-095640 | 4/2003 |
| JP | 2006-072283 | 3/2006 |
| JP | 2006-106596 | 4/2006 |
| JP | 2007-304409 | 11/2007 |
| WO | 91/04992 | 4/1991 |
| WO | 97/04029 | 2/1997 |
| WO | 9704029 | 2/1997 |
| WO | 98/53000 | 11/1998 |
| WO | 9853000 | 11/1998 |
| WO | 00/75226 | 12/2000 |
| WO | 01/87999 | 11/2001 |
| WO | 02/31002 | 4/2002 |
| WO | 0241987 | 5/2002 |
| WO | 02/081233 | 10/2002 |
| WO | 02/100936 | 12/2002 |
| WO | 03/032061 | 4/2003 |
| WO | 03/085040 | 10/2003 |
| WO | 2004/058874 | 7/2004 |
| WO | 2006/069793 | 7/2006 |
| WO | 2008/014464 | 1/2008 |
| WO | 2008/079276 | 7/2008 |
| WO | 2008/079807 | 7/2008 |
| WO | 2009/006434 | 1/2009 |

OTHER PUBLICATIONS

Zemel, Irina Sopja, Dec. 3, 2009 Final Office Action from U.S. Appl. No. 11/305,279 [10 pp.].
Harlan, Robert D., Dec. 4, 2009 Notice of Allowance from U.S. Appl. No. 11/117,981 [5 pp.].
Mullis, Jeffrey C., Dec. 18, 2009 Supplemental Notice of Allowability from U.S. Appl. No. 11/050,115 [2 pp.].
Harlan, Robert D., Dec. 29, 2009 Notice of Allowance from U.S. Appl. No. 10/791,177 [6 pp.].
Peets, Monique R., Jan. 5, 2010 Final Office Action from U.S. Appl. No. 11/697,801 [9 pp.].
Pak, Hannah J., Jan. 6, 2010 Final Office Action from U.S. Appl. No. 11/941,128 [10 pp.].
Harlan, Robert D., Final Office Action dated Dec. 10, 2008 from U.S. Appl. No. 10/791,177 (8 pp.).
Cain, Edward J., Final Office Action dated Dec. 9, 2008 from U.S. Appl. No. 11/642,795 (6 pp.).
Mulcahy, Peter D., Restriction/Election Office Action dated Dec. 11, 2008 from U.S. Appl. No. 11/642,802 (7 pp.).
Lipman, Bernard, Notice of Allowance dated Jan. 14, 2009 from U.S. Appl. No. 11/058,156 (5 pp.).
Harlan, Robert D., Office Action dated Jan. 9, 2009 from U.S. Appl. No. 11/117,981 (6 pp.).
Cain, Edward J., Notice of Allowance dated Dec. 31, 2008 from U.S. Appl. No. 11/642,124 (5 pp.).
Harlan, Robert D., Dec. 28, 2009 Office Action from U.S. Appl. No. 12/504,255 [6 pp.].
Wheeler, Thurman Michael, Feb. 8, 2010 Office Action from U.S. Appl. No. 11/642,796 [13 pp.].
Lipman, Bernard, Notice of Allowance dated Jan. 27, 2009 from U.S. Appl. No. 11/764,607 (4 pp.).
Johnson, Edward M., International Search Report dated Dec. 12, 2008 from PCT Application No. PCT/US07/74611 (5 pp.).
Wang, Xiaorong et al., U.S. Appl. No. 12/374,883, filed Jul. 27, 2007, entitled "Polymeric Core-Shell Nanoparticles with Interphase Region".
Haider, Saira Bano, Mar. 3, 2009 Advisory Action from U.S. Appl. No. 11/104,759 (3 pp.).
Mullis, Jeffrey C., Mar. 11, 2009 Office Action from U.S. Appl. No. 10/791,049 (9 pp.).
Harlan, Robert D., Mar. 11, 2009 Notice of Allowance from U.S. Appl. No. 10/791,177 (8 pp.).
Sykes, Altrev C., Mar. 20, 2009 Office Action from U.S. Appl. No. 11/818,023 (27 pp.).
Pak, Hannah J., Apr. 2, 2009 Office Action from U.S. Appl. No. 11/941,128 (9 pp.).
Sykes, Altrev C., Apr. 5, 2010 Final Office Action from U.S. Appl. No. 11/818,023 (24 pp.).
Peets, Monique R., Apr. 15, 2010 Notice of Allowance from U.S. Appl. No. 11/697,801 (5 pp.).
Pak, Hannah J., Apr. 30, 2010 Notice of Allowance from U.S. Appl. No. 11/941,128 (11 pp.).
Harlan, Robert D., April 30, 2009 Office Action from U.S. Appl. No. 11/117,981 (7 pp.).
Mullis, Jeffrey C., Apr. 30, 2009 Final Office Action from U.S. Appl. No. 11/641,514 (11 pp.).
Mulcahy, Peter D., May 13, 2009 Office Action from U.S. Appl. No. 11/642,802 (7 pp.).
Ishizu, Koji et al., "Core-Shell Type Polymer Microspheres Prepared by Domain Fixing of Block Copolymer Films", Journal of Polymer Science: Part A: Polymer Chemistry, vol. 27, pp. 3721-3731 (1989).
Ishizu, Koji et al., "Preparation of core-shell type polymer microspheres from anionic block copolymers", Polymer, vol. 34, No. 18, pp. 3929-3933 (1993).

O'Reilly, Rachel K. et al., "Functionalization of Micelles and Shell Cross-linked Nanoparticles Using Click Chemistry", Chem. Mater., vol. 17, No. 24, pp. 5976-5988 [Nov. 24, 2005].

Saito, Reiko et al., "Core-Shell Type Polymer Microspheres Prepared From Poly(Styrene-b-Methacrylic Acid)—1. Synthesis of Microgel", Eur. Polym. J., vol. 27, No. 10, pp. 1153-1159 (1991).

Saito, Reiko et al., "Arm-number effect of core-shell type polymer microsphere: 1. Control of arm-number of microsphere", Polymer, vol. 35, No. 4, pp. 866-871 (1994).

Peets, Monique R., May 11, 2009 Restriction/Election Office Action from U.S. Appl. No. 11/697,801 (6 pp.).

Mullis, Jeffrey C., May 19, 2009 Advisory Action from U.S. Appl. No. 10/791,049 (5 pp.).

Zemel, Irina Sopja, Office Action dated May 28, 2009 from U.S. Appl. No. 11/305,279 (7 pp.).

Mullis, Jeffrey C., Jul. 15, 2009 Advisory Action from U.S. Appl. No. 11/641,514 (4 pp.).

Peets, Monique R., Jul. 20, 2009 Office Action from U.S. Appl. No. 11/697,801 (9 pp.).

Kralik, M. et al., "Catalysis by metal nanoparticles supported on functional organic polymers", Journal of Molecular Catalysis A: Chemical, vol. 177, pp. 113-138 [2001].

Wang, Xiaorong et al., U.S. Appl. No. 10/791,049, filed Mar. 2, 2004 entitled "Method Of Making Nano-Particles Of Selected Size Distribution".

Wang, Xiaorong et al., U.S. Appl. No. 10/791,177, filed Mar. 2, 2004 entitled "Rubber Composition Containing Functionalized Polymer Nanoparticles".

Wang, Xiaorong et al., U.S. Appl. No. 10/872,731, filed Jun. 21, 2004 entitled "Reversible Polymer/Metal Nano-Composites And Method For Manufacturing Same".

Wang, Xiaorong et al., U.S. Appl. No. 10/886,283, filed Jul. 6, 2004 entitled "Hydropobic Surfaces with Nanoparticles".

Wang, Xiaorong et al., U.S. Appl. No. 11/058,156, filed Feb. 15, 2005 entitled "Multi-Layer Nano-Particle Preparation and Applications".

Wang, Xiaorong et al., U.S. Appl. No. 11/104,759, filed Apr. 13, 2005 entitled "Nano-Particle Preparation and Applications".

Bohm, Georg G.A. et al. U.S. Appl. No. 11/117,981, filed Apr. 29, 2005 entitled "Self Assembly of Molecules to Form Nano-Particle".

Wang, Xiaorong et al., U.S. Appl. No. 11/305,279, filed Dec. 16, 2005 entitled "Combined Use of Liquid Polymer and Polymeric Nanoparticles for Rubber Applications".

Wang, Xiaorong et al., U.S. Appl. No. 11/344,861, filed Feb. 1, 2006 entitled "Nano-Composite And Compositions Therefrom".

Wang, Xiaorong et al., U.S. Appl. No. 11/642,796, filed Dec. 20, 2006 entitled "Hollow Nano-Particles And Method Thereof".

Wang, Xiaorong et al., U.S. Appl. No. 11/764,607, filed Jun. 18, 2007 entitled "Multi-Layer Nano-Particle Preparation and Applications".

Wang, Xiaorong et al., U.S. Appl. No. 11/941,128, filed Nov. 16, 2007 entitled "Nano-Particle Preparation And Applications".

Wang, Xiaorong et al., U.S. Appl. No. 11/954,268, filed Dec. 12, 2007 entitled "Nanoporous Polymeric Material And Preparation Method".

Wang, Xiaorong et al., U.S. Appl. No. 12/047,896, filed Mar. 13, 2008 entitled "Reversible Polymer/Metal Nano-Composites And Method For Manufacturing Same".

Wang, Xiaorong et al., U.S. Appl. No. 12/184,895, filed Aug. 1, 2008 entitled "Disk-Like Nanoparticles".

Akashi, Mitsuru et al., "Synthesis and Polymerization of a Styryl Terminated Oligovinylpyrrolidone Macromonomer", Die Angewandte Makromolekulare Chemie, 132, pp. 81-89 (1985).

Alexandridis, Paschalis et al., "Amphiphilic Block Copolymers: Self-Assembly and Applications", Elsevier Science B.V., pp. 1-435 (2000).

Allgaier, Jurgen et al., "Synthesis and Micellar Properties of PS-PI Block Copolymers of Different Architecture", ACS Polym. Prepr. (Div Polym. Chem.), vol. 37, No. 2, pp. 670-671 (1996).

Antonietti, Markus et al., "Determination of the Micelle Architecture of Polystyrene/Poly(4-vinylpyridine) Block Copolymers in Dilute Solution", Macromolecules, 27, pp. 3276-3281 (1994).

Antonietti, Markus et al., "Novel Amphiphilic Block Copolymers by Polymer Reactions and Their Use for Solubilization of Metal Salts and Metal Colloids", Macromolecules, 29, pp. 3800-3806 (1996).

Batzilla, Thomas et al., "Formation of intra- and intermolecular crosslinks in the radical crosslinking of poly(4-vinylstyrene)", Makromol. Chem., Rapid Commun. 8, pp. 261-268 (1987).

Bauer, B.J. et al., "Synthesis and Dilute-Solution Behavior of Model Star-Branched Polymers", Rubber Chemistry and Technology, vol. 51, pp. 406-436 (1978).

Berger, G. et al., "Mutual Termination of Anionic and Cationic 'Living' Polymers", Polymer Letters, vol. 4, pp. 183-186 (1966).

Bohm, Georg et al., "Emerging materials: technology for new tires and other rubber products", Tire Technology International, 2006 (4 pp.).

Borukhov, Itamar et al., "Enthalpic Stabilization of Brush-Coated Particles in a Polymer Melt", Macromolecules, vol. 35, pp. 5171-5182 (2002).

Bradley, John S., "The Chemistry of Transition Metal Colloids", Clusters and Colloids: From Theory to Applications, Chapter 6, Weinheim, VCH, pp. 459-544 (1994).

Braun, Hartmut et al., "Enthalpic interaction of diblock copolymers with immiscible polymer blend components", Polymer Bulletin, vol. 32, pp. 241-248 (1994).

Bronstein, Lyudmila M. et al., "Synthesis of Pd-, Pt-, and Rh-containing polymers derived from polystyrene-polybutadiene block copolymers; micellization of diblock copolymers due to complexation", Macromol. Chem. Phys., 199, pp. 1357-1363 (1998).

Brown, H.R. et al., "Communications to the Editor: Enthalpy-Driven Swelling of a Polymer Brush", Macromolecules, vol. 23, pp. 3383-3385 (1990).

Cahn, John W., "Phase Separation by Spinodal Decomposition in Isotropic Systems", The Journal of Chemical Physics, vol. 42, No. 1, pp. 93-99 (Jan. 1, 1965).

Calderara, Frederic et al., "Synthesis of chromophore-labelled polystyrene/poly(ethylene oxide) diblock copolymers", Makromol. Chem., 194, pp. 1411-1420 (1993).

Chen, Ming-Qing et al., "Graft Copolymers Having Hydrophobic Backbone and Hydrophilic Branches. XXIII. Particle Size Control of Poly(ethylene glycol)—Coated Polystyrene Nanoparticles Prepared by Macromonomer Method", Journal of Polymer Science: Part A: Polymer Chemistry, vol. 37, pp. 2155-2166 (1999).

Chen, Ming-Qing et al., "Nanosphere Formation in Copolymerization of Methyl Methacrylate with Poly(ethylene glycol) Macromonomers", Journal of Polymer Science: Part A: Polymer Chemistry, vol. 38, pp. 1811-1817 (2000).

Edmonds, William F. et al., "Disk Micelles from Nonionic Coil-Coil Diblock Copolymers", Macromolecules, vol. 39, pp. 4526-4530 (May 28, 2006).

Ege, Seyhan, Organic Chemistry Structure and Reactivity, 3rd Edition, p. 959 (1994).

Eisenberg, Adi, "Thermodynamics, Kinetics, and Mechanisms of the Formation of Multiple Block Copolymer Morphologies", Polymer Preprints, vol. 41, No. 2, pp. 1515-1516 (2000).

Erhardt, Rainer et al., Macromolecules, vol. 34, No. 4, pp. 1069-1075 (2001).

Eschwey, Helmut et al., "Preparation and Some Properties of Star-Shaped Polymers with more than Hundred Side Chains", Die Makromolekulare Chemie 173, pp. 235-239 (1973).

Eschwey, Helmut et al., "Star polymers from styrene and divinylbenzene", Polymer, vol. 16, pp. 180-184 (Mar. 1975).

Fendler, Janos H., "Nanoparticles and Nanostructured Films: Preparation, Characterization and Applications", Wiley-VCH, pp. 1-468 (1998).

Ferreira, Paula G. et al., "Scaling Law for Entropic Effects at Interfaces between Grafted Layers and Polymer Melts", Macromolecules, vol. 31, pp. 3994-4003 (1998).

Garcia, Carlos B. et al., "Self-Assembly Approach toward Magnetic Silica-Type Nanoparticles of Different Shapes from Reverse Block Copolymer Mesophases", J. Am. Chem. Soc., vol. 125, pp. 13310-13311 (2003).

Gay, C., "Wetting of a Polymer Brush by a Chemically Identical Polymer Melt", Macromolecules, vol. 30, pp. 5939-5943 (1997).

Halperin, A., "Polymeric Micelles: A Star Model", Macromolecules, vol. 20, pp. 2943-2946 (1987).

Hamley, Ian W., "The Physics of Block Copolymers", Oxford Science Publication: Oxford, Chapters 3 and 4, pp. 131-265, (1998).

Hasegawa, Ryuichi et al., "Optimum Graft Density for Dispersing Particles in Polymer Melts", Macromolecules, vol. 29, pp. 6656-6662 (1996).

Ishizu, Koji et al., "Synthesis of Star Polymer with Nucleus of Microgel", Polymer Journal, vol. 12, No. 6, pp. 399-404 (1980).

Ishizu, Koji, "Structural Ordering of Core Crosslinked Nanoparticles and Architecture of Polymeric Superstructures", ACS Polym. Prepr. (Div Polym Chem) vol. 40, No. 1, pp. 456-457 (1999).

Kraus, Gerard, "Mechanical Losses in Carbon-Black-Filled Rubbers", Journal of Applied Polymer Science: Applied Polymer Symposium, vol. 39, pp. 75-92 (1984).

Ligoure, Christian, "Adhesion between a Polymer Brush and an Elastomer: A Self-Consistent Mean Field Model", Macromolecules, vol. 29, pp. 5459-5468 (1996).

Liu, Guojun et al., "Diblock Copolymer Nanofibers", Macromolecules, 29, pp. 5508-5510 (1996).

Liu, T. et al., "Formation of Amphiphilic Block Copolymer Micelles in Nonaqueous Solution", Amphiphilic Block Copolymers: Self-Assembly and Applications, Elsevier Science B.V., pp. 115-149 (2000).

Ma, Qinggao et al., "Entirely Hydrophilic Shell Cross-Linked Knedel-Like (SCK) Nanoparticles", Polymer Preprints, vol. 41, No. 2, pp. 1571-1572 (2000).

Matsen, M.W., "Phase Behavior of Block Copolymer/Homopolymer Blends", Macromolecules, vol. 28, pp. 5765-5773 (1995).

Mayer, A.B.R. et al., "Transition metal nanoparticles protected by amphiphilic block copolymers as tailored catalyst systems", Colloid Polym. Sci., 275, pp. 333-340 (1997).

Mi, Yongli et al., "Glass transition of nano-sized single chain globules", Polymer 43, Elsevier Science Ltd., pp. 6701-6705 (2002).

Milner, S.T. et al., "Theory of the Grafted Polymer Brush", Macromolecules, vol. 21, pp. 2610-2619 (1988).

Milner, S.T. et al., "End-Confined Polymers: Corrections to the Newtonian Limit", Macromolecules, vol. 22, pp. 489-490 (1989).

Nace, Vaughn M., "Nonionic Surfactants: Polyoxyalkylene Block Copolymers", Surfactant Science Series, vol. 60, pp. 1-266 (1996).

Noolandi, Jaan et al., "Theory of Block Copolymer Micelles in Solution", Macromolecules, vol. 16, pp. 1443-1448 (1983).

Okay, Oguz et al., "Steric stabilization of reactive microgels from 1,4-divinylbenzene", Makromol. Chem., Rapid Commun., vol. 11, pp. 583-587 (1990).

Okay, Oguz et al., "Anionic Dispersion Polymerization of 1,4-Divinylbenzene", Macromolecules, 23, pp. 2623-2628 (1990).

Piirma, Irja, "Polymeric Surfactants", Surfactant Science Series, vol. 42, pp. 1-289 (1992).

Price, Colin, "Colloidal Properties of Block Copolymers", Applied Science Publishers Ltd., Chapter 2, pp. 39-80 (1982).

Rager, Timo et al., "Micelle formation of poly(acrylic acid)- block-poly(methyl methacrylate) block copolymers in mixtures of water with organic solvents", Macromol. Chem. Phys., 200, No. 7, pp. 1672-1680 (1999).

Rein, David H. et al., "Kinetics of arm-first star polymers formation in a non-polar solvent", Macromol. Chem. Phys., vol. 199, pp. 569-574 (1998).

Rempp, Paul et al., "Grafting and Branching of Polymers", Pure Appl. Chem., vol. 30, pp. 229-238 (1972).

Riess, Gerard et al., "Block Copolymers", Encyclopedia of Polymer Science and Engineering, vol. 2, pp. 324-434 (1985).

Saito, Reiko et al., "Synthesis of Microspheres with Microphase-Separated Shells", Journal of Polymer Science: Part A: Polymer Chemistry, vol. 38, pp. 2091-2097 (2000).

Semenov, A.N., "Theory of Diblock-Copolymer Segregation to the Interface and Free Surface of a Homopolymer Layer", Macromolecules, vol. 25, pp. 4967-4977 (1992).

Semenov, A.N., "Phase Equilibria in Block Copolymer-Homopolymer Mixtures", Macromolecules, vol. 26, pp. 2273-2281 (1993).

Serizawa, Takeshi et al., "Transmission Electron Microscopic Study of Cross-Sectional Morphologies of Core-Corona Polymeric Nanospheres", Macromolecules, 33, pp. 1759-1764 (2000).

Shull, Kenneth R., "End-Adsorbed Polymer Brushes in High- and Low-Molecular-Weight Matrices", Macromolecules, vol. 29, pp. 2659-2666 (1996).

Stepanek, Miroslav et al. "Time-Dependent Behavior of Block Polyelectrolyte Micelles in Aqueous Media Studied by Potentiometric Titrations, QELS and Fluoroetry", Langmuir, Vo. 16, No. 6, pp. 2502-2507 (2000).

Thurmond II, K. Bruce et al., "Water-Soluble Knedel-like Structures: The Preparation of Shell-Cross-Linked Small Particles", J. Am. Chem. Soc., vol. 118, pp. 7239-7240 (1996).

Thurmond II, K. Bruce et al., "The Study of Shell Cross-Linked Knedels (SCK), Formation and Application", ACS Polym. Prepr. (Div Polym. Chem.), vol. 38, No. 1, pp. 62-63 (1997).

Tsitsilianis, Constantinos et al., Makromol. Chem. 191, pp. 2319-2328 (1990).

Tuzar, Zdenek et al., "Micelles of Block and Graft Copolymers in Solutions", Surface and Colloid Science, vol. 15, Chapter 1, pp. 1-83 (1993).

Vamvakaki, M. et al., "Synthesis of novel block and statistical methacrylate-based ionomers containing acidic, basic or betaine residues", Polymer, vol. 39, No. 11, pp. 2331-2337 (1998).

van der Maarel, J.R.C. et al., "Salt-Induced Contraction of Polyelectrolyte Diblock Copolymer Micelles", Langmuir, vol. 16, No. 19, pp. 7510-7519 (2000).

Wang, Xiaorong et al., "Chain conformation in two-dimensional dense state", Journal of Chemical Physics, vol. 121, No. 16, pp. 8158-8162 (Oct. 22, 2004).

Wang, Xiaorong et al., "Strain-induced nonlinearity of filled rubbers", Physical Review E 72, 031406, pp. 1-9 (Sep. 20, 2005).

Pre-print article, Wang, Xiaorong et al., "PMSE 392- Manufacture and Commercial Uses of Polymeric Nanoparticles", Division of Polymeric Materials: Science and Engineering (Mar. 2006).

Wang, Xiaorong et al., "Manufacture and Commercial Uses of Polymeric Nanoparticles", Polymeric Materials: Science and Engineering, vol. 94, p. 659 (2006).

Wang, Xr. et al., "Fluctuations and critical phenomena of a filled elastomer under deformation", Europhysics Letters, vol. 75, No. 4, pp. 590-596 (Aug. 15, 2006).

Wang, Xiaorong et al., "Synthesis, Characterization, and Application of Novel Polymeric Nanoparticles", Macromolecules, 40, pp. 499-508 (2007).

Wang, Xiaorong et al., "Under microscopes the poly(styrene/butadiene) nanoparticles", Journal of Electron Microscopy, vol. 56, No. 6, pp. 209-216 (2007).

Webber, Stephen E. et al., "Solvents and Self-Organization of Polymers", NATO ASI Series, Series E: Applied Sciences, vol. 327, pp. 1-509 (1996).

Whitmore, Mark Douglas et al., "Theory of Micelle Formation in Block Copolymer-Homopolymer Blends", Macromolecules, vol. 18, pp. 657-665 (1985).

Wijmans, C.M. et al., "Effect of Free Polymer on the Structure of a Polymer Brush and Interaction between Two Polymer Brushes", Macromolecules, vol. 27, pp. 3238-3248 (1994).

Witten, T.A. et al., "Stress Relaxation in the Lamellar Copolymer Mesophase", Macromolecules, vol. 23, pp. 824-829 (1990).

Wooley, Karen L, "From Dendrimers to Knedel-like Structures", Chem. Eur. J., 3, No. 9, pp. 1397-1399 (1997).

Wooley, Karen L, "Shell Crosslinked Polymer Assemblies: Nanoscale Constructs Inspired from Biological Systems", Journal of Polymer Science: Part A: Polymer Chemistry, vol. 38, pp. 1397-1407 (2000).

Worsfold, Denis J. et al., "Preparation et caracterisation de polymeres-modele a structure en etoile, par copolymerisation sequencee anionique", Canadian Journal of Chemistry, vol. 47, pp. 3379-3385 (Mar. 20, 1969).

Worsfold, D.J., "Anionic Copolymerization of Styrene with p-Divinylbenzene", Macromolecules, vol. 3, No. 5, pp. 514-517 (Sep.-Oct. 1970).

Zheng, Lei et al., "Polystyrene Nanoparticles with Anionically Polymerized Polybutadiene Brushes", Macromolecules, 37, pp. 9954-9962 (2004).

Zilliox, Jean-Georges et al., "Preparation de Macromolecules a Structure en Etoile, par Copolymerisation Anionique", J. Polymer Sci.: Part C, No. 22, pp. 145-156 (1968).

Bridgestone Americas 2006 Presentation (14 pp.).

Oct. 20, 2005 Office Action from U.S. Appl. No. 11/104,759, filed Apr. 13, 2005 (12 pp.).
Aug. 21, 2006 Final Office Action from U.S. Appl. No. 11/104,759, filed Apr. 13, 2005 (14 pp.).
Dec. 22, 2006 Advisory Action from U.S. Appl. No. 11/104,759, filed Apr. 13, 2005 (3 pp.).
May 16, 2007 Office Action from U.S. Appl. No. 11/104,759, filed Apr. 13, 2005 (9 pp.).
Oct. 30, 2007 Final Office Action from U.S. Appl. No. 11/104,759, filed Apr. 13, 2005 (11 pp.)
Bohm, Georg G.A. et al., U.S. Appl. No. 11117,981, filed Apr. 29, 2005 entitled "Self Assembly of Molecules to Form Nano-Particle".
Cui, Honggang et al., "Block Copolymer Assembly via Kinetic Control", Science, vol. 317, pp. 647-650 (Aug. 3, 2007).
Wang, Xiaorong et al., "Heterogeneity of structural relaxation in a particle-suspension system", EPL, 79, 18001, pp. 1-5 (Jul. 2007).
Haider, Saira Bano, Sep. 11, 2009 Examiner's Answer from U.S. Appl. No. 11/104,759 (9 pp.).
Harlan, Robert D., Sep. 29, 2009 Final Office Action from U.S. Appl. No. 11/117,981 (6 pp.).
Sykes, Altrev C., Oct. 16, 2009 Office Action from U.S. Appl. No. 11/818,023 [20 pp.].
Mullis, Jeffrey C., Nov. 9, 2009 Office Action from U.S. Appl. No. 11/641,514 [9 pp.].
Mulcahy, Peter D., Nov. 9, 2009 Final Office Action from U.S. Appl. No. 11/642,802 [6 pp.].
Kiliman, Leszek B., Nov. 13, 2009 Office Action from U.S. Appl. No. 10/817,995 [6 pp.].
Sakurai, Ryo et al., "68.2: Color and Flexible Electronic Paper Display using QR-LPD Technology", SID 06 Digest, pp. 1922-1925 (2006).
Asinovsky, Olga, Jun. 20, 2006 Office Action from U.S. Appl. No. 10/791,049, filed Mar. 2, 2004 (11 pp.).
Asinovsky, Olga, Dec. 22, 2006 Office Action from U.S. Appl. No. 10/791,049, filed Mar. 2, 2004 (11 pp.).
Asinovsky, Olga, Jun. 7, 2007 Office Action from U.S. Appl. No. 10/791,049, filed Mar. 2, 2004 (11 pp.).
Asinovsky, Olga, Nov. 28, 2007 Office Action from U.S. Appl. No. 10/791,049, filed Mar. 2, 2004 (9 pp.).
Asinovsky, Olga, May 21, 2008 Office Action from U.S. Appl. No. 10/791,049, filed Mar. 2, 2004 (11 pp.).
Asinovsky, Olga, Sep. 11, 2008 Office Action from U.S. Appl. No. 10/791,049, filed Mar. 2, 2004 (12 pp.).
Ronesi, Vickey M., Jan. 8, 2007 Office Action from U.S. Appl. No. 10/791,177, filed Mar. 2, 2004 (5 pp.).
Harlan, Robert D., May 3, 2007 Office Action from U.S. Appl. No. 10/791,177, filed Mar. 2, 2004 (6 pp.).
Harlan, Robert D., Oct. 18, 2007 Office Action from U.S. Appl. No. 10/791,177, filed Mar. 2, 2004 (6 pp.).
Harlan, Robert D., May 28, 2008 Office Action from U.S. Appl. No. 10/791,177, filed Mar. 2, 2004 (8 pp.).
Kiliman, Leszek B., Sep. 9, 2005 Office Action from U.S. Appl. No. 10/817,995, filed Apr. 5, 2004 (7 pp.).
Kiliman, Leszek B., Mar. 23, 2006 Office Action from U.S. Appl. No. 10/817,995, filed Apr. 5, 2004 (7 pp.).
Kiliman, Leszek B., Dec. 13, 2006 Office Action from U.S. Appl. No. 10/817,995, filed Apr. 5, 2004 (6 pp.).
Kiliman, Leszek B., Sep. 5, 2008 Office Action from U.S. Appl. No. 10/817,995, filed Apr. 5, 2004 (5 pp.).
Wyrozebski Lee, Katarzyna I., Dec. 19, 2006 Office Action from U.S. Appl. No. 10/872,731, filed Jun. 21, 2004 (6 pp.).
Wyrozebski Lee, Katarzyna I., Mar. 7, 2007 Office Action from U.S. Appl. No. 10/872,731, filed Jun. 21, 2004 (13 pp.).
Wyrozebski Lee, Katarzyna I., Sep. 14, 2007 Office Action from U.S. Appl. No. 10/872,731, filed Jun. 21, 2004 (9 pp.).
Chevalier, Alicia Ann, Sep. 6, 2006 Office Action from U.S. Appl. No. 10/886,283, filed Jul. 6, 2004 (5 pp.).
Chevalier, Alicia Ann, Jan. 4, 2007 Office Action from U.S. Appl. No. 10/886,283, filed Jul. 6, 2004 (8 pp.).
Chevalier, Alicia Ann, Jul. 2, 2007 Office Action from U.S. Appl. No. 10/886,283, filed Jul. 6, 2004 (8 pp.).
Chevalier, Alicia Ann, Jan. 4, 2008 Office Action from U.S. Appl. No. 10/886,283, filed Jul. 6, 2004 (8 pp.).
Mullis, Jeffrey C., Oct. 31, 2006 Office Action from U.S. Appl. No. 11/050,115, filed Feb. 3, 2005 (6 pp.).
Mullis, Jeffrey C., Mar. 24, 2008 Office Action from U.S. Appl. No. 11/050,115, filed Feb. 3, 2005 (10 pp.).
Mullis, Jeffrey C., Aug. 21, 2008 Office Action from U.S. Appl. No. 11/050,115, filed Feb. 3, 2005 (7 pp.).
Lipman, Bernard., Sep. 29, 2006 Office Action from U.S. Appl. No. 11/058,156, filed Feb. 15, 2005 (5 pp.).
Raza, Saira B., Oct. 20, 2005 Office Action from U.S. Appl. No. 11/104,759, filed Apr. 13, 2005 (10 pp.).
Raza, Saira B., Aug. 21, 2006 Office Action from U.S. Appl. No. 11/104,759, filed Apr. 13, 2005 (6 pp.).
Haider, Saira Bano, May 16, 2007 Office Action from U.S. Appl. No. 11/104,759, filed Apr. 13, 2005 (9 pp.).
Haider, Saira Bano, Oct. 30, 2007 Office Action from U.S. Appl. No. 11/104,759, filed Apr. 13, 2005 (9 pp.).
Haider, Saira Bano, Jun. 12, 2008 Office Action from U.S. Appl. No. 11/104,759, filed Apr. 13, 2005 (10 pp.).
Harlan, Robert D., Nov. 7, 2005 Office Action from U.S. Appl. No. 11/117,981, filed Apr. 29, 2005 (7 pp.).
Harlan, Robert D., Jul. 20, 2006 Office Action from U.S. Appl. No. 11/117,981, filed Apr. 29, 2005 (6 pp.).
Harlan, Robert D., Jan. 26, 2007 Office Action from U.S. Appl. No. 11/117,981, filed Apr. 29, 2005 (8 pp.).
Harlan, Robert D., Jul. 12, 2007 Office Action from U.S. Appl. No. 11/117,981, filed Apr. 29, 2005 (6 pp.).
Harlan, Robert D., Jan. 2, 2008 Office Action from U.S. Appl. No. 11/117,981, filed Apr. 29, 2005 (6 pp.).
Harlan, Robert D., Jul. 25, 2008 Office Action from U.S. Appl. No. 11/117,981, filed Apr. 29, 2005 (8 pp.).
Maksymonko, John M., Feb. 20, 2008 Office Action from U.S. Appl. No. 11/305,279, filed Dec. 16, 2005 (14 pp.).
Maksymonko, John M., Aug. 6, 2008 Office Action from U.S. Appl. No. 11/305,279, filed Dec. 16, 2005 (11 pp.).
Maksymonko, John M., Jul. 17, 2008 Office Action from U.S. Appl. No. 11/305,281, filed Dec. 16, 2005 (13 pp.).
Le, Hoa T., Sep. 25, 2008 Office Action from U.S. Appl. No. 11/612,554, filed Dec. 19, 2006 (8 pp.).
Maksymonko, John M., Jun. 13, 2008 Office Action from U.S. Appl. No. 11/641,514, filed Dec. 19, 2006 (7 pp.).
Mullis, Jeffrey C., Oct. 31, 2008 Office Action from U.S. Appl. No. 11/641,514, filed Dec. 19, 2006 (10 pp.).
Maksymonko, John M., Jun. 11, 2008 Office Action from U.S. Appl. No. 11/642,124, filed Dec. 20, 2006 (16 pp.).
Maksymonko, John M., May 30, 2008 Office Action from U.S. Appl. No. 11/642,795, filed Dec. 20, 2006 (12 pp.).
Maksymonko, John M., May 28, 2008 Office Action from U.S. Appl. No. 11/642,802, filed Dec. 20, 2006 (10 pp.).
Chen, Jizhuang, Dec. 30, 2005 Office Action from Chinese Patent Application No. 02819527.2 filed Oct. 4, 2002 (9 pp.).
Chen, Jizhuang, Dec. 21, 2007 Office Action from Chinese Patent Application No. 02819527.2 filed Oct. 4, 2002 (12 pp.).
Chen, Jizhuang, Sep. 26, 2008 Office Action from Chinese Patent Application No. 02819527.2 filed Oct. 4, 2002 (4 pp.).
Schutte, M., Aug. 8, 2006 Office Action from European Patent Application No. 02807196.7 filed Oct. 4, 2002 (5 pp.).
Schutte, Maya, Sep. 3, 2007 Office Action from European Patent Application No. 02807196.7 filed Oct. 4, 2002 (2 pp.).
Watanabe, Y., May 7, 2008 Office Action from Japanese Patent Application No. 582224/2003 filed Oct. 4, 2002 (5 pp.).
Watanabe, Y., Jul. 29, 2008 Office Action from Japanese Patent Application No. 582224/2003 filed Oct. 4, 2002 (17 pp.).
May 30, 2008 International Search Report from PCT Patent Application No. PCT/US2007/026031 filed Dec. 19, 2007 (4 pp.).
May 27, 2008 International Search Report from PCT Patent Application No. PCT/US2007/087869 filed Dec. 18, 2007 (4 pp.).
Aug. 25, 2008 International Search Report from PCT Patent Application No. PCT/US2008/068838 filed Jun. 30, 2008 (4 pp.).
Star Polymers by Immobilizing Functional Block Copolymers, by Koji Ishizu, Tokyo Institute of Technology, Meguro-ku, Tokyo, Japan, Star and Hyperbranched Polymers, 1999, ISBN 0-8247-1986-7.

Formation of Worm-like Micelles from a Polystyrene-Polybutadiene-Polystyrene Block Copolymer in Ethyl Acetate, Canham et al., J.C.S. Faraday I, 1980, 76, 1857-1867.

Anomalous Behaviour of Solutions of Styrene-Butadiene Block Copolymers in Some Solvents, Tuzar et al., Makromol. Chem. 178, 22743-2746, 1977.

Association of Block Copolymers in Selective Solvents, 1 Measurements on Hydrogenated Poly(styrene-isoprene) in Decane and in trans-Decalin, Mandema et al., Makromol. Chem. 180, 1521-1538, 1979.

Light-Scattering Studies of a Polystyrene-Poly(methyl methacrylate) Two-Blcok Copolymer in Mixed Solvents, Utiyama et al. Macromolecules vol. 7, No. 4, Jul.-Aug. 1974.

Greenwod, N.N.; Earnshaw, A., Chemistry of the Elements, pp. 1126-1127, Pergaroen Press, New York 1984.

Functionalized Core-Shell Polymers Prepared by Microemulsion Polymerization, E. Mendizabal et al., Dept. of Ingenieria Quimica, Unviv. De Guadalajara, MX, 477/ANTE 97/1733-1737.

Kink-Block and Gauche-Block Structures of Bimolecular Films, Gehard Lagaly, Chem. Int. Ed. Engl. vol. 15 (1976) No. 10, pp. 575-586.

Linear Viscoelasticity of Disordered Polystyrene-Polyisoprene . . . Layered-Silicate Nanocomposites, J. Ren, Dept. of Chem Eng. Univ. of Houston, Macromol. 2000, pp. 3739-3746.

Rheology of End-Tethered Polymer Layered Silicate Nanocomposites, R. Krishnamoorti et al., Macromol. 1997, 30, 4097-4102.

Rheology of Nanocomposites Based on Layered Silicates and Polyamide-12, B. Hoffman et al., Colloid Polm. Sci. 278:629-636 (2000).

Quaternary Ammonium Compounds, Encyclopedia of Chem Tech., 4th Ed. vol. 20, 1996, Wiley & Sons, pp. 739-767.

Dendritic Macromolecules: Synthesis of Starburst Dendrimers, Donald A. Tomalia et al., Macromolecules vol. 19, No. 9, 1986, contribution from Functional Polymers/Processes and the Analytical Laboratory, Dow Chemical, Midland, MI 48640, pp. 2466-2468.

Preparation and Characterization of Heterophase Blends of Polycaprolactam and Hydrogenated Polydienes, David F. Lawson et al., pp. 2331-2351, Central Research Labs., The Firestone Tire and Rubber Col, Akron, OH 44317, Journal of Applied Polymer Science, vol. 39, 1990 John Wiliey & Sons, Inc.

R.P. Quirk and S.C. Galvan, Macromolecules, 34, 1192-1197 (2001).

M. Moller, J.P. Spaz, A. Roescher, S. Mobmer, S.T. Selvan, H. A. Klok, Macromol. Symp. 117, 207-218 (1997).

T. Cosgrove, J.S. Phipps, R.M. Richardson, Macromolecules, 26, 4363-4367 (1993).

S. Mossmer, J.P. Spatz, M.Moller, T. Aberle, J. Schmidt, W. Burchard, Macromol. 33, 4791-4798 (2000).

Ultrahydrophobic and Ultrayophobic Surfaces: Some Comments and Examples, Wei Chen et al., The ACS Journal of Surfaces and Colloids, May 11, 1999, vol. 15, No. 10, pp. 3395-3399, Polymer Science and Engineering Dept., Univ. of MA, Amherst, MA 01003.

Super-Repellent Composite Fluoropolymer Surfaces, S.R. Coulson, I. Woodward, J.P.S. Badyal, The Journal of Physical Chemistry B, vol. 104, No. 37, Sep. 21, 2000, pp. 8836-8840, Dept. of Chemistry, Science Laboratories, Durham University, Durham, DH1 3LE, England, U.K.

Transformation of a Simple Plastic into a Superhydrophobic Surface, H. Yildirim Erbil et al., Science vol. 299, Feb. 28, 2003, pp. 1377-1380.

Reaction of Primary Aliphatic Amines with Maleic Anhydride, Lester E. Coleman et al., J. Org,. Chem., 24, 185, 1959, pp. 135-136.

Synthesis, Thermal Properties and Gas Permeability of Poly (N-n-alkylmaleimide)s, A. Matsumoto et al., Polymer Journal vol. 23, No. 3, 1991, pp. 201-209.

Simultaneous TA and MS Analysis of Alternating Styrene-Malei Anhydride and Styrene-Maleimide Copolymers, Thermochim. Acta, 277, 14, 1996.

Synthesis and Photocrosslinking of Maleimide-Type Polymers, Woo-Sik Kim et al., Macromol. Rapid Commun., 17, 835, 1996, pp. 835-841.

Polysulfobetaines and Corresponding Cationic Polymers. IV. Synthesis and Aqueous Solution Properties of Cationic Poly (MIQSDMAPM), Wen-Fu Lee et al., J. Appl. Pol. Sci. vol. 59, 1996, pp. 599-608.

Chemical Modification of Poly (styrene-co-maleic anhydride) with Primary N-Alkylamines by Reactive Extrusion, I Vermeesch et al., J. Applied Polym. Sci., vol. 53, 1994, pp. 1365-1373.

Vulcanization Agents and Auxiliary Materials, Kirk-Othmer, Encyclopedia of Chemical Technology, 3rd Ed., Wiley Interscience, NY, 1982, vol. 22, pp. 390-403.

Dialkylimidazolium Chloroaluminate Melts: A New Class of Room-Temperature Ionic Liquids for Electrochemistry, Spectroscopy, and Synthesis. J.S. Wilkes, J.A. Levisky, B.A. Wilson, Inorg. Chem. 1982, 21, pp. 1263-1264.

Polymer-m-Ionic-Liquid Electrolytes C. Tiyapiboonchaiya, D.R. MacFarlane, J. Sun, M. Forsyth, Micromol. Chem. Phys., 2002, 203, pp. 1906-1911.

EXAFS Investigations of the Mechanism of Facilitated Ion Transfer into a Room-Temperature Ionic Liquid. M. Jensen, J.A. Dzielawa, P. Rickert, M.L. Dietz, Jacs, 2002, 124, pp. 10664-10665.

Structure of molten 1,3-dimethylimidazolium chloride using neutron diffraction.C. Hardacre, J.D. Holbrey, S.E. J. McMath, D.T. Bowron, A.K. Soper, J. Chem. Physics, 2003, 118(1), pp. 273-278.

Reverse Atom Transfer Radical Polymerization of Methyl Methacrylate in Room-Temperature Inoic Liqquids, H. Ma, X. Wan, X. Chen, Q-F. Zhou, J. Polym. Sci., A. Polym. Chem. 2003, 41, pp. 143-151.

Non-Debye Relaxations in Disordered Ionic Solids, W. Dieterich, P. Maass, Chem. Chys. 2002, 284, pp. 439-467.

Polymer Layered Silicate Nanocomposites, Giannelis E.P. Advanced Materials vol. 8, No. 1, Jan. 1, 1996, pp. 29-35.

A Review of Nanocomposites 2000, J.N. Hay, S. J. Shaw.

Recent Advances in Flame Retardant Polymer Nanocomposites, Tilman, J.W. et al., pp. 273-283.

"Dendrimers and Dendrons, Concept, Synthesis, Application", edited by Newkome G.R, Wiley-VCH, 2001, pp. 45, 191-310.

"Synthesis, Functionalization and Surface Treatment of Nanoparticles", edited by Baraton M-I, ASP (Am. Sci. Pub.), Stevenson Ranch, California, 2003, pp. 51-52, 174-208.

Bahadur, Pratap, "Block copolymers—Their microdomain formation (in solid state) and surfactant behaviour (in solution)", Current Science, vol. 80, No. 8, pp. 1002-1007, Apr. 25, 2001.

Guo, Andrew et al., "Star Polymers and Nanospheres from Cross-Linkable Diblock Copolymers", Macromolecules, vol. 29, pp. 2487-2493, Jan. 17, 1996.

Ishizu, Koji et al., "Core-Shell Type Polymer Microspheres Prepared from Block Copolymers", Journal of Polymer Science: Part C: Polymer Letters, vol. 26, pp. 281-286, 1988.

Ishizu, Koji, "Synthesis and Structural Ordering of Core-Shell Polymer Microspheres", Prog. Polym. Sci., vol. 23, pp. 1383-1408, 1998.

O'Reilly, Rachel K. et al., "Cross-linked block copolymer micelles: functional nanostructures of great potential and versatility", Chem. Soc. Rev., vol. 35, pp. 1068-1083, Oct. 2, 2006.

Oranli, Levent et al., "Hydrodynamic studies on micellar solutions of styrene-butadiene block copolymers in selective solvents", Can. J. Chem., vol. 63, pp. 2691-2696, 1985.

Pispas, S. et al., "Effect of Architecture on the Micellization Properties of Block Copolymers: $A_2$ B Miktoarm Stars vs AB Diblocks", Macromolecules, vol. 33, pp. 1741-1746, Feb. 17, 2000.

Riess, Gerard, "Micellization of block copolymers", Prog. Polym. Sci., vol. 28, pp. 1107-1170, Jan. 16, 2003.

Saito, Reiko et al., "Synthesis of microspheres with 'hairy-ball' structures from poly (styrene-b-2-vinyl pyridine) diblock copolymers", Polymer, vol. 33, No. 5, pp. 1073-1077, 1992.

Thurmond, K. Bruce et al., "Shell cross-linked polymer micelles: stabilized assemblies with great versatility and potential", Colloids and Surfaces B: Biointerfaces, vol. 16, pp. 45-54, 1999.

Wilson, D.J. et al., "Photochemical Stabilization of Block Copolymer Micelles", Eur. Polym. J., vol. 24, No. 7, pp. 617-621, 1988.

Lipman, Bernard, Mar. 26, 2002 Notice of Allowance from U.S. Appl. No. 09/970,830, filed Oct. 4, 2001 (4 pp.).

Kiliman, Leszek B., Feb. 13, 2003 Office from U.S. Appl. No. 10/038,748, filed Dec. 31, 2001 (3 pp.).

Kiliman, Leszak B., Aug. 25, 2003 Notice of Allowance from U.S. Appl. No. 10/038,748, filed Dec. 31, 2001 (5 pp.).
Harlan, Robert D., Mar. 17, 2004 Restriction/Election Office Action from U.S. Appl. No. 10/223,393, filed Aug. 19, 2002 (6 pp.).
Harlan, Robert D., Jun. 22, 2004 Office Action from U.S. Appl. No. 10/223,393, filed Aug. 19, 2002 (6 pp.).
Harlan, Robert D., Jan. 3, 2005 Notice of Allowance from U.S. Appl. No. 10/223,393, filed Aug. 19, 2002 (6 pp.).
Lipman, Bernard, Mar. 25, 2004 Restriction/Election Office Action from U.S. Appl. No. 10/331,841, filed Dec. 30, 2002 (6 pp.).
Lipman, Bernard, Nov. 18, 2004 Notice of Allowance from U.S. Appl. No. 10/331,841, filed Dec. 30, 2002 (5 pp.).
Lipman, Bernard, Mar. 24, 2004 Restriction/Election Office Action from U.S. Appl. No. 10/345,498, filed Jan. 16, 2003 (5 pp.).
Lipman, Bernard, Nov. 23, 2004 Notice of Allowance from U.S. Appl. No. 10/345,498, filed Jan. 16, 2003 (5 pp.).
Choi, Ling Siu, Mar. 24, 2006 Office Action from U.S. Appl. No. 10/755,648, filed Jan. 12, 2004 (11 pp.).
Choi, Ling Siu, Dec. 4, 2006 Notice of Allowance from U.S. Appl. No. 10/755,648, filed Jan. 12, 2004 (9 pp.).
Asinovsky, Olga, Aug. 16, 2007 Advisory Action from U.S. Appl. No. 10/791,049, filed Mar. 2, 2004 (2 pp.).
Asinovsky, Olga, Jul. 29, 2008 Advisory Action from U.S. Appl. No. 10/791,049, filed Mar. 2, 2004 (3 pp.).
Harlan, Robert D., Jan. 9, 2008 Advisory Action from U.S. Appl. No. 10/791,177, filed Mar. 2, 2004 (3 pp.).
Harlan, Robert D., Mar. 7, 2008 Advisory Action from U.S. Appl. No. 10/791,177, filed Mar. 2, 2004 (3 pp.).
Le, Hoa T., Dec. 14, 2004 Office Action from U.S. Appl. No. 10/791,491, filed Mar. 2, 2004 (5 pp.).
Le, Hoa T., Jul. 5, 2005 Office Action from U.S. Appl. No. 10/791,491, filed Mar. 2, 2004 (9 pp.).
Le, Hoa T., Apr. 10, 2006 Notice of Allowance from U.S. Appl. No. 10/791,491, filed Mar. 2, 2004 (5 pp.).
Kiliman, Leszak B., May 15, 2007 Advisory Action from U.S. Appl. No. 10/817,995, filed Apr. 5, 2004 (2 pp.).
Kiliman, Leszak B., Apr. 2, 2008 Notice of Allowance from U.S. Appl. No. 10/817,995, filed Apr. 5, 2004 (5 pp.).
Mullis, Jeffrey C., Nov. 5, 2008 Advisory Action from U.S. Appl. No. 11/050,115, filed Feb. 3, 2005 (4 pp.).
Lipman, Bernard, May 21, 2007 Notice of Allowance from U.S. Appl. No. 11/058,156, filed Feb. 15, 2005 (3 pp.).
Lipman, Bernard, Aug. 28, 2007 Notice of Allowance from U.S. Appl. No. 11/058,156, filed Feb. 15, 2005 (5 pp.).
Lipman, Bernard, Feb. 28, 2008 Notice of Allowance from U.S. Appl. No. 11/058,156, filed Feb. 15, 2005 (5 pp.).
Lipman, Bernard, May 29, 2008 Notice of Allowance from U.S. Appl. No. 11/058,156, filed Feb. 15, 2005 (5 pp.).
Lipman, Bernard, Oct. 3, 2006 Notice of Allowance from U.S. Appl. No. 11/064,234, filed Feb. 22, 2005 (5 pp.).
Haider, Saira Bano, Dec. 22, 2006 Advisory Action from U.S. Appl. No. 11/104,759, filed Apr. 13, 2005 (3 pp.).
Haider, Saira Bano, Mar. 19, 2008 Advisory Action from U.S. Appl. No. 11/104,759, filed Apr. 13, 2005 (3 pp.).
Haider, Saira Bano, Dec. 2, 2008 Office Action from U.S. Appl. No. 11/104,759, filed Apr. 13, 2005 (10 pp.).
Lipman, Bernard, Sep. 14, 2006 Office Action from U.S. Appl. No. 11/168,297, filed Jun. 29, 2005 (4 pp.).
Lipman, Bernard, Mar. 2, 2007 Notice of Allowance from U.S. Appl. No. 11/168,297, filed Jun. 29, 2005 (3 pp.).
Lipman, Bernard, Apr. 18, 2007 Supplemental Notice of Allowability from U.S. Appl. No. 11/168,297, filed Jun. 29, 2005 (3 pp.).
Lipman, Bernard, Mar. 20, 2008 Office Action from U.S. Appl. No. 11/764,607, filed Jun. 18, 2007 (4 pp.).
Lipman, Bernard, Sep. 25, 2008 Notice of Allowance from U.S. Appl. No. 11/764,607, filed Jun. 18, 2007 (3 pp.).
Russell, Graham, Nov. 4, 2008 Office Action from European Patent Application No. 05742316.2 filed Mar. 28, 2005 (2 pp.).
Schutte, M., Nov. 13, 2003 International Search Report from PCT Patent Application No. PCT/US02/31817 filed Oct. 4, 2002 (3 pp.).
Schutte, M., May 28, 2004 International Search Report from PCT Patent Application No. PCT/US03/40375 filed Dec. 18, 2003 (3 pp.).
Iraegui Retolaza, E., Jul. 9, 2004 International Search Report from PCT Patent Application No. PCT/US2004/001000 filed Jan. 15, 2004 (3 pp.).
Russell, G., Aug. 1, 2005 International Search Report from PCT Patent Application No. PCT/US2005/010352 filed Mar. 28, 2005 (3 pp.).
Mettler, Rolf-Martin, May 27, 2008 International Search Report from PCT Patent Application No. PCT/US2007/087869 filed Dec. 18, 2007 (2 pp.).
Iraegui Retolaza, E., May 30, 2008 International Search Report from PCT Patent Application No. PCT/US2007/026031 filed Dec. 19, 2007 (3 pp.).

ONE-POT SYNTHESIS OF NANOPARTICLES AND LIQUID POLYMER FOR RUBBER APPLICATIONS

FIELD

The technology discussed herein relates generally to rubber compositions. In particular, it relates to methods for synthesizing nanoparticle and liquid polymer blends in a single batch.

BACKGROUND

As depicted in the example shown in FIG. 1, the nanoparticles described herein are each made up of a group or a collection of several polymer chains that are organized around a center 1. The polymer chains are linked together at one end at a core formed from cross-linked monomer units on each polymer chain. The polymer chains extend from the core 2 outwardly to form a shell 3. The shell 3 includes the monomer units of the polymers that are not in the core 2. It should be understood that the shell 3 is not limited to a single monomer unit in each polymer chain, but may include several monomer units. Additionally, the shell 3 may be separated into sublayers, and the sublayers may include blocks of various homopolymer or copolymer. For example, a sublayer may include a block of randomized styrene-butadiene copolymer or a homopolymer such as butadiene. The outermost layer of the shell 4, is comprised of the monomer units or functionally or non-functionally initiated polymer chain heads at the outer terminal ends of each polymer. The shell 4 is the outermost portion of the nanoparticle. The living polymer chains form micelles due to the aggregation of ionic chain ends and the chemical interactions of the polymer chains in hydrocarbon solvent. When the multiple-vinyl aromatic monomer is added, the micelles become crosslinked and the stable nanoparticle is formed.

Nanoparticles and liquid polymers for use in rubber compositions are known from commonly owned U.S. patent application Ser. No. 11/305,279, which is hereby incorporated by reference. The combination of nanoparticle and liquid polymer improves important properties of rubber articles, such as vehicle tires, and in particular, the tread portion of vehicle tires. For example, wet/dry traction and rolling resistance of tire tread can be improved with the addition of nanoparticles and liquid polymers while maintaining good reinforcement for tread durability. A reduction or elimination of the amount of processing oils needed in a composition used for vehicle tires, and this is made possible by the liquid polymer and nanoparticle rubber composition.

However, there are difficulties in synthesizing and processing the previously disclosed nanoparticles and liquid polymers. Previously known methods involve synthesizing nanoparticles and liquid polymer separately, drying them separately, and then separately adding each component into a rubber composition. The nanoparticles suffer from poor dispersion in the rubber compound and the liquid polymer is difficult to process. Processing problems stem from the fact that the liquid polymer is a highly viscous substance that is very difficult to separate from solvent and dry. The two separate components also have to be stored separately, thereby consuming valuable inventory space.

SUMMARY

The technology disclosed herein allows the nanoparticles and liquid polymer to be synthesized together in the same batch. The resulting blend is easier to process and dry than a separately synthesized liquid polymer. The blend also facilitates dispersion of the nanoparticles. It also saves inventory space since only one product in one container needs to be stored, instead of two products in two containers.

A method for performing a one-batch synthesis of a blend of nanoparticles and liquid polymer includes polymerizing a first monomer and optionally a second monomer in a hydrocarbon solvent to form the liquid polymer. The polymerization is partially terminated with a quenching agent. Then a charge of polymerization initiator, and a mixture of multiple-vinyl aromatic monomer and mono-vinyl aromatic monomer are added. This causes further polymerization whereby nanoparticles are formed in situ having a core including the multiple-vinyl aromatic monomer, and a shell including the first monomer or the first monomer and the second monomer.

A composition of matter consists essentially of a blend of core-shell type micellar nanoparticles and a liquid polymer. The nanoparticles are dispersed and blended with the liquid polymer.

The blends of nanoparticle and liquid polymer made by the methods disclosed herein may be added to a rubber composition to produce a nanoparticle/liquid polymer rubber composition. As an example, a tire that incorporates the nanoparticle/liquid polymer rubber composition can be formed by a tire tread comprising the rubber composition, and constructing a tire using the tire tread.

DETAILED DESCRIPTION

Figure 1:
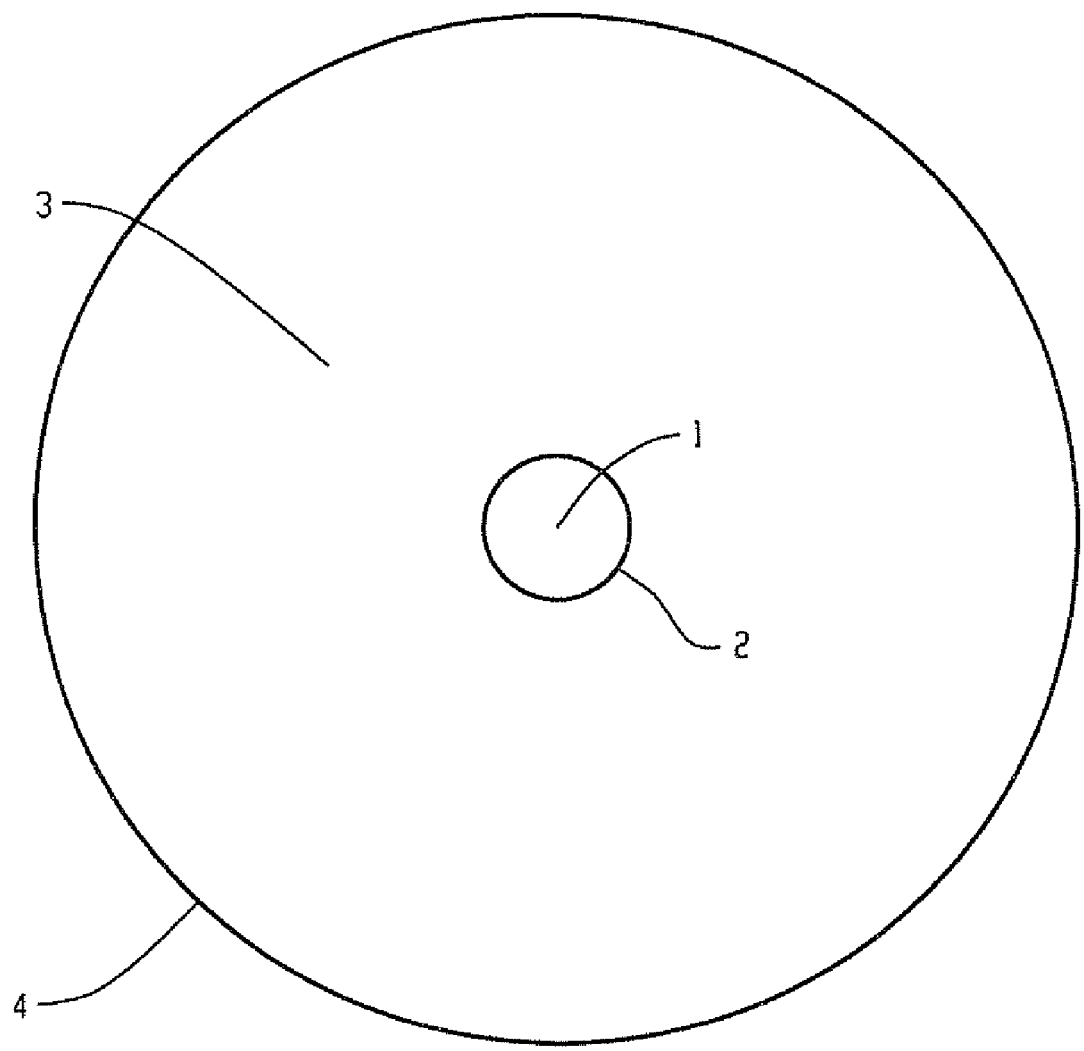
FIG. 1 shows a diagram of a nanoparticle.
Figure 2:
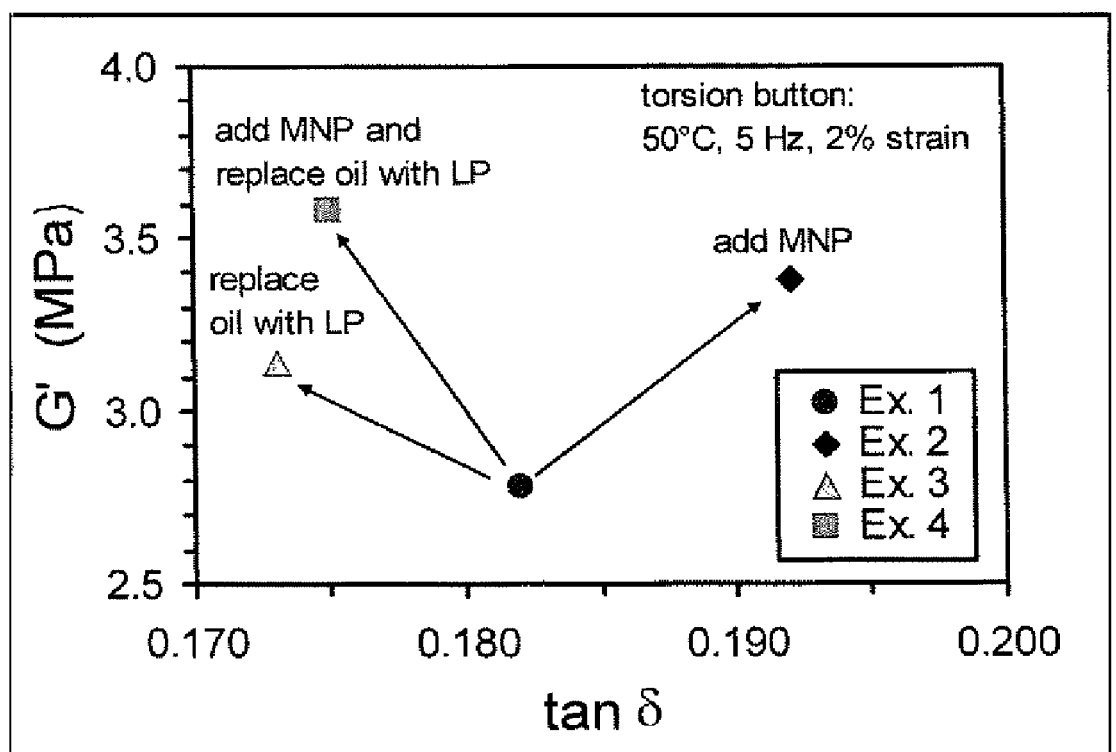
FIG. 2 shows a rubber article with improved reinforcement and controllable hysteresis in an embodiment of the present invention.

Methods for performing a one-batch synthesis for making a blend of nanoparticles and liquid polymer are disclosed herein. An illustrative method involves a liquid polymer polymerization process wherein a first monomer and a second monomer are polymerized in a hydrocarbon solvent in a pot (reaction vessel). The copolymerization process is allowed to proceed to completion and is partially terminated with a quenching agent. These monomers copolymerize to form a liquid polymer. The ratio of terminated polymers to unterminated, living polymers can vary according to the application. A broad range is 1-99 wt % terminated, liquid polymer to 99-1 wt % unterminated, living polymer. A preferable range for at least some applications is 25-75 wt % terminated, liquid polymer to 75-25 wt % unterminated, living polymer.

As part of this example method, a charge of polymerization initiator and a mixture of multiple-vinyl aromatic monomer and a mono-vinyl aromatic monomer are added to the same pot that contains the liquid polymer. This charge initiates a second polymerization process wherein unterminated monomer chains left over from the liquid polymer polymerization process copolymerize with the mono-vinyl aromatic monomer. The resulting copolymers self-assemble into core-shell type micelle structures in the hydrocarbon solvent. The multiple-vinyl aromatic monomer functions to cross-link the micelles holding them together as nanoparticles.

As used herein, unless otherwise stated, a charge or addition to the reaction vessel may be simultaneous or stepwise. Stepwise means that either the addition of one ingredient is completed before the addition of another ingredient is begun, or the addition of one ingredient is begun (but not necessarily completed) before the addition of another ingredient has begun.

Alternatively, another illustrative method involves a liquid polymerization step as described above. However, in this method the nanoparticle polymerization process differs in that there is a step-wise addition of a charge of mono-vinyl aromatic monomer (first), and then (secondly) a charge of multiple-vinyl aromatic monomer and initiator to the pot. The resulting copolymers self-assemble into core-shell type micelles in the hydrocarbon solvent, and the multiple-vinyl aromatic monomer functions to cross-link the micelles holding them together as nanoparticles.

The blends that result from the first method and the second method are typically not the same. Under similar conditions, the first method produces polymer nanoparticles with a core densely crosslinked at the center of the core; while the second method gives polymer nanoparticles with a core relatively less densely crosslinked, but crosslinked throughout the entire core.

The crosslinking density can be defined as number of crosslinks per monomer (Xd). In an example where the nanoparticle comprises monomers of styrene and divinyl benzene as the crosslinking agent, the Xd is determined by the ratio of moles of DVB to moles of DVB and styrene. This number may range from 0.01 to 1, for example 0.1 to 0.8, such as 0.2 to 0.4. In the example first method described above the cross-linking density may be 0.2-0.4, for example 0.3, and in the example second method described above the cross-linking density may be 0.8-1.0, for example 0.9.

Preferably a crosslinking agent is selected which has an affinity to the vinyl-substituted aromatic hydrocarbon monomer blocks and migrates to the center of the micelles due to its compatibility with the monomer units and initiator residues present in the center of the micelle and its relative incompatibility with the solvent and monomer units present in the outer layer of the micelle.

The one-batch processes described herein yields a blend that is easier to process and dry than when the liquid polymer is synthesized separately. Dispersion of the nanoparticles is also facilitated. The resulting blends also save inventory space since only one product in one container needs to be stored, instead of two products in two containers.

The first step of the illustrative methods described above results in the polymerization of the liquid polymer. A first monomer is added to a reaction vessel along with an anionic initiator to start the polymerization of the monomers and form a liquid polymer. The liquid polymer may comprise a homopolymer, such as polybutadiene, when only a single type of monomer is polymerized. The liquid polymer may also comprise a copolymer, such as styrene-butadiene copolymer when a first and second monomer are polymerized.

The anionic initiator is preferably selected from any known organolithium compounds. Suitable organolithium compounds are represented by the formula as shown below:

wherein R is a hydrocarbyl group having 1 to x valence(s). R generally contains 1 to 20, preferably 2-8, carbon atoms per R group, and x is an integer of 1-4. Typically, x is 1, and the R group includes aliphatic radicals and cycloaliphatic radicals, such as alkyl, cycloalkyl, cycloalkylalkyl, alkylcycloalkyl, alkenyl, as well as aryl and alkylaryl radicals. Other known initiators can also be employed. As specific examples, n-butyllithium, sec-butyl lithium, tert-butyllithium, or a mixture thereof can be used as initiators.

The polymerization is partially terminated by adding a quenching agent. This partial termination leaves unterminated polymers for forming the shell of the nanoparticle in the subsequent nanoparticle polymerization process. The partial termination step is relatively fast. For example, the partial termination may be run for about 15 minutes. As used herein, partial means less than complete.

The liquid polymer can be made by a batch process or continuously. Typically, a hydrocarbon solvent is used, although it may be possible to use other solvents. According to the process disclosed herein there are some advantages to synthesizing the liquid polymer in a batch process. However, it is also possible to perform the method described herein by a continuous process in a single batch. By "single batch" or "one-batch" it is meant that there is no isolation and drying between polymerization steps. In a continuous process the monomers and an initiator are continuously fed into the reaction vessel with solvent.

The pressure in the reaction vessel should be sufficient to maintain a substantially liquid phase under the conditions of the polymerization reaction. The reaction medium may generally be maintained at a temperature that is within the range of about 20° C. to about 140° C. throughout the copolymerization.

After the reaction has had time to proceed to for a relatively low molecular weight polymer, the reaction is quenched by adding a terminating agent (also called a quenching agent as used herein). The amount of terminating agent added determines how much of the polymer becomes terminated liquid polymer, and how much of the polymer remains unterminated with a living end. Since the polymers with living ends are later used to form the shell layer of the nanoparticles, the amount of terminating agent also determines the ratio of liquid polymer to nanoparticles in the nanoparticle/liquid polymer blend.

The formation of the liquid polymer is complete after the reaction is partially terminated with the quenching agent. In the illustrative methods described herein a charge is then added that begins the nanoparticle polymerization process.

In an illustrative nanoparticle polymerization process, an anionic initiator is first added (i.e. before adding the mono- and multiple-vinyl aromatic monomers) to aid in forming and stabilizing of micelles before cross-linking occurs. The initiator can also be added at the same time as the mono-vinyl aromatic monomer and multiple-vinyl aromatic monomers although preferably not through the same port. Initiators may be those described above.

After addition of the initiator or concurrently with the addition of the initiator the mono-vinyl aromatic monomer and multiple-vinyl aromatic monomer are added to the same reaction vessel that the liquid polymer was formed in. The initiator encourages the mono-vinyl aromatic monomer to copolymerize with the unterminated polymer chains left over from the liquid polymer process to form a copolymer. This occurs through an anionic, living polymerization. The copolymer chains then self-assemble in the hydrocarbon solvent into micelles. The multiple-vinyl aromatic monomer serves to cross-link the micelles holding them together as nanoparticles.

In one example, the copolymers are di-block copolymers comprising a polyconjugated diene block and a mono-vinyl aromatic block, such as block styrene-butadiene. The mono-vinyl aromatic blocks are typically crosslinked by the multiple-vinyl aromatic monomer. The polymer nanoparticles preferably retain their discrete nature with little or no polymerization between each other. In some embodiments, the nanoparticles are substantially monodisperse and uniform in shape, in others the nanoparticles have a polymodal size distribution.

The copolymerization of the nanoparticle chains may last as long as necessary until the desired monomer conversion, degree of polymerization (DP), and block polymer molecular weight are obtained. The polymerization reaction of this step may last typically from about 0.5 hours to about 20 hours, preferably from about 0.5 hours to about 10 hours, more preferably from about 0.5 hours to about 5 hours. The polymerization reaction of this step may be conducted at a temperature of from about 30° F. to about 300° F., preferably from about 100° F. to about 250° F., and more preferably from about 150° F. to about 210° F.

The polymerization reactions used to prepare the polymer nanoparticles may be terminated with a terminating agent. Suitable terminating agents include, but are not limited to, alcohols such as methanol, ethanol, propanol, and isopropanol. In exemplified embodiments, the polymerization reaction mixture was cooled and dropped in an isopropanol/acetone solution containing an antioxidant such as butylated hydroxytoluene (BHT). The isopropanol/acetone solution may be prepared, for example, by mixing 1 part by volume of isopropanol and 4 parts by volume of acetone.

To terminate the polymerization of the nanoparticle chains, and thus control polymer molecular weight, a functional terminating agent may be employed to provide terminal functionality. Exemplary functional terminating agents include, but are not limited to, $SnCl_4$, $R_3SnCl$, $R_2SnCl_2$, $RSnCl_3$, carbodiimides, N-methylpyrrolidine, cyclic amides, cyclic ureas, isocyanates, Schiff bases, 4,4'-bis(diethylamino)benzophenone, N,N'-dimethylethyleneurea, and mixtures thereof, wherein R is selected from the group consisting of alkyls having from about 1 to about 20 carbon atoms, cycloalkyls having from about 3 to about 20 carbon atoms, aryls having from about 6 to about 20 carbon atoms, aralkyls having from about 7 to about 20 carbon atoms, and mixtures thereof.

In an example, a liquid hydrocarbon medium serves as a dispersion solvent and facilitates the formation of the micelle-like nanoparticles. This hydrocarbon solvent is added in the liquid polymer polymerization step and if necessary more may be added with the nanoparticle polymerization charge. The liquid hydrocarbon may be selected from any suitable aliphatic hydrocarbons, alicyclic hydrocarbons, or mixture thereof, with a proviso that it exists in liquid state during the nanoparticles' formation procedure. Exemplary aliphatic hydrocarbons include, but are not limited to, pentane, isopentane, 2,2 dimethyl-butane, hexane, heptane, octane, nonane, decane, and the like. Exemplary alicyclic hydrocarbons include, but are not limited to, cyclopentane, methyl cyclopentane, cyclohexane, methyl cyclohexane, cycloheptane, cyclooctane, cyclononane, cyclodecane, and the like. In one embodiment, the liquid hydrocarbon medium comprises hexane.

The liquid polymer that is present in the batch can also be considered a solvent. The liquid polymer also aids in dispersion by intercalating itself between the living polymer chains when they are in the micelle formation. This helps to isolate the inside of the nanoparticle from the solvent. Consequently, this causes the micelle to be more stable and decreases the chances of two or more micelles meeting each other and potentially linking, which would result in the creation of much larger particles. The liquid polymer causes the nanoparticle to swell, and the resulting mixture is softer and more easily mixed into rubber compounds.

Without being bound to any particular theory, it is believed that the poly(conjugated diene) block is more soluble or miscible in a selected liquid solvent, such as hexane, than the mono-vinyl aromatic block. This facilitates the subsequent micelle-like assembling and nanoparticle formation from the block copolymer chains.

Depending on their miscibility, polymer chains in solution or suspension system can be self-assembled into domains of various structures. Without being bound to any theory, it is believed that a micelle-like structure may be formed by aggregating the block copolymer chains comprising the poly (conjugated diene) block and the aromatic block. The mono-vinyl aromatic blocks are typically directed toward the center of the micelle and the poly(conjugated diene) blocks are typically extended away from the center.

The polymer nanoparticles are formed from the cross-linked micelle-like structures with a core made from the mono-vinyl aromatic blocks, and a shell made from the poly (conjugated diene) blocks. It is believed that the multiple-vinyl aromatic monomers crosslink the center core of the micelle to stabilize and hold together the polymer nanoparticles.

In an alternative example, the nanoparticle polymerization step may be conducted in the presence of a modifier or a 1,2-microstructure controlling agent, so as to, for example, increase the reaction rate, equalize the reactivity ratio of monomers, and/or control the 1,2-microstructure in the conjugated diene monomers. Suitable modifiers include, but are not limited to, triethylamine, tri-n-butylamine, hexamethylphosphoric acid triamide, N,N, N',N'-tetramethylethylene diamine, ethylene glycol dimethyl ether, diethylene glycol dimethyl ether, triethylene glycol dimethyl ether, tetraethylene glycol dimethyl ether, tetrahydrofuran, 1,4-diazabicyclo [2.2.2]octane, diethyl ether, tri-n-butylphosphine, p-dioxane, 1,2 dimethoxy ethane, dimethyl ether, methyl ethyl ether, ethyl propyl ether, di-n-propyl ether, di-n-octyl ether, anisole, dibenzyl ether, diphenyl ether, dimethylethylamine, bix-oxolanyl propane, tri-n-propyl amine, trimethyl amine, triethyl amine, N,N-dimethyl aniline, N-ethylpiperidine, N-methyl-N-ethyl aniline, N-methylmorpholine, tetramethylenediamine, oligomeric oxolanyl propanes (OOPs), 2,2-bis-(4-methyl dioxane), bistetrahydrofuryl propane, and the like.

Other modifiers or 1,2-microstructure controlling agents used in the present invention may be linear oxolanyl oligomers represented by the structural formula (IV) and cyclic oligomers represented by the structural formula (V), as shown below:

Formula (IV)

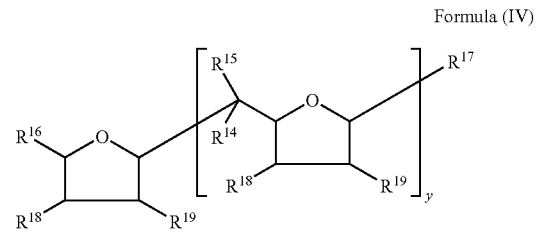

Formula (V)

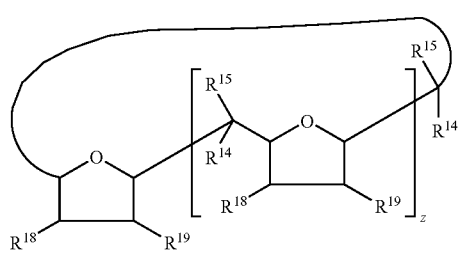

wherein $R^{14}$ and $R^{15}$ are independently hydrogen or a $C_1$-$C_8$ alkyl group; $R^{16}$, $R^{17}$, $R^{18}$, and $R^{19}$ are independently hydrogen or a $C_1$-$C_6$ alkyl group; y is an integer of 1 to 5 inclusive, and z is an integer of 3 to 5 inclusive.

Specific examples of modifiers or 1,2-microstructure controlling agents include, but are not limited to, oligomeric oxolanyl propanes (OOPs); 2,2-bis-(4-methyl dioxane); bis(2-oxolanyl)methane; 1,1-bis(2-oxolanyl)ethane; bistetrahydrofuryl propane; 2,2-bis(2-oxolanyl) propane; 2,2-bis(5-methyl-2-oxolanyl)propane; 2,2-bis-(3,4,5-trimethyl-2-oxolanyl)propane; 2,5-bis(2-oxolanyl-2-propyl)oxolane; octamethyl perhydrocyclotetrafurfurylene (cyclic tetramer); 2,2-bis(2-oxolanyl)butane; and the like. A mixture of two or more modifiers or 1,2-microstructure controlling agents also can be used.

The synthesized liquid polymer that results from the liquid polymerization process comprises a homopolymer of conjugated diene monomers or a copolymer of conjugated diene monomers with, for example, vinyl aromatic monomers and/or trienes such as myrcene, among others. As used herein, liquid polymers of conjugated diene monomers include not only polymers of the same conjugated diene monomers such as a liquid poly(butadiene), but also include copolymers of one or more conjugated diene monomers with other monomers; for example, isoprene-butadiene rubber or styrene-butadiene rubber.

The conjugated diene monomer may be one or more of conjugated diene monomers. $C_4$-$C_8$ conjugated diene monomers of formula (I) are the most preferred. Specific examples of the conjugated diene monomers include, but are not limited to, 1,3-butadiene, isoprene (2-methyl-1,3-butadiene), cis- and trans-piperylene (1,3-pentadiene), 2,3-dimethyl-1,3-butadiene, 1,3-pentadiene, cis- and trans-1,3⁻hexadiene, cis- and trans-2-methyl-1,3-pentadiene, cis- and trans-3-methyl-1,3-pentadiene, 4-methyl-1,3-pentadiene, 2,4-dimethyl-1,3-pentadiene, and the like, and the mixture thereof. In preferred embodiments, isoprene or 1,3-butadiene or mixtures thereof is used as the conjugated diene monomer(s).

The number average molecular weight (Mn) of the liquid polymer is preferably controlled (e.g. by controlling the ratio of monomers to initiator) within the range of from about 10,000 to about 120,000, within the range of from about 20,000 to about 110,000, or within the range of from about 25,000 to about 100,000. The weight average molecular weight of the liquid polymer can range from about 20,000 to 100,000, for example 70,000 to 90,000.

The glass transition temperature (Tg) of the liquid polymer is, for example, within the range of from about −90° C. to about −20° C., such as within the range of from about −90° C. to about −40° C., or from about −90° C. to about −50° C. The liquid polymer may exhibit only one glass transition temperature.

When the synthesized liquid polymer is a copolymer of conjugated diene monomer(s), the comonomer may be vinyl aromatic monomer selected from the group consisting of styrene, ethylvinylbenzene, a-methyl-styrene, 1-vinyl naphthalene, 2-vinyl naphthalene, vinyl toluene, methoxystyrene, t-butoxystyrene, and the like; as well as alkyl, cycloalkyl, aryl, alkaryl, and aralkyl derivatives thereof, in which the total number of carbon atoms in the monomer is generally not greater than about 20; and mixtures thereof. In exemplary embodiments, the conjugated diene monomer and vinyl aromatic monomer are normally used at the weight ratios of about 99:1 to about 1:99, or about 30:70 to about 90:10, or preferably about 85:15 to about 60:40.

The liquid polymer may comprise polyisoprene, polybutadiene, styrene-butadiene copolymer, styrene-isoprene-butadiene copolymer, styrene-isoprene copolymer, butadiene-isoprene copolymer, liquid butyl rubber, liquid neoprene, ethylene-propylene copolymer, ethylene-propylene-diene copolymer, acrylonitrile-butadiene copolymer, liquid silicone, ethylene acrylic copolymer, ethylene vinyl acetate copolymer, liquid epichlorohydrin, liquid chlorinated polyethylene, liquid chlorosulfonated polyethylene rubbers, liquid hydrogenated nitrile rubber, liquid tetrafluoroethylene-propylene rubber, liquid hydrogenated polybutadiene and styrene-butadiene copolymer, and the like, and the mixture thereof.

In one example the liquid polymer is a styrene-butadiene copolymer. The styrene-butadiene has an Mw of about 80,000 to 120,000 and is comprised of repeat units that are derived from about 5 weight percent to about 95 weight percent styrene and correspondingly from about 5 weight percent to about 95 weight percent 1,3-butadiene, wherein the repeat units derived from styrene and 1,3-butadiene are in essentially random order. In this example, in the liquid polymerization process of the illustrative methods, the first monomer is styrene and the second monomer is butadiene. Vinyl percentages of 50-60% are preferred for some applications because this range is easy to achieve synthetically with styrene as the monomer. However, lower vinyl levels are also possible.

In another example, the liquid polymer comprises a liquid isoprene-butadiene rubber (IBR) with Mw of about 35,000 to 70,000, which is comprised of repeat units that are derived from about 5 weight percent to about 95 weight percent isoprene and correspondingly from about 5 weight percent to about 95 weight percent 1,3-butadiene, wherein the repeat units derived from isoprene and 1,3-butadiene are in essentially random order. In this example, the first monomer is isoprene and the second monomer is butadiene according to the illustrative methods described above.

The polymer nanoparticles synthesized in the one-batch methods described herein include a vulcanizable shell and a crosslinked core. The monomers that comprise the shell may be curable by vulcanization by sulfur or peroxide. Examples of suitable sulfur vulcanizing agents include "rubber maker's" soluble sulfur; elemental sulfur (free sulfur); sulfur donating vulcanizing agents such as organosilane polysulfides, amine disulfides, polymeric polysulfides or sulfur olefin adducts; and insoluble polymeric sulfur. Related prior patents and publications U.S. Pat. No. 6,437,050 (Bridgestone Corp.) and Macromol. Symp. 118, 143-148 (1997) disclose some suitable sulfur vulcanizing agents.

The monomers that make up the shell comprise the unterminated polymer chains left over from the polymerization of the liquid polymer.

In a variety of exemplary embodiments, the shell may be made up of any suitable conjugated diene or mixture thereof. $C_4$-$C_8$ 1,3-conjugated diene monomers are the most preferred.

In a variety of exemplary embodiments, specific examples of the shell monomers include, but are not limited to, 1,3-butadiene, isoprene (2-methyl-1,3-butadiene), cis- and trans-piperylene(1,3-pentadiene), 2,3-dimethyl-1,3-butadiene, 1,3-pentadiene, cis- and trans-1,3-hexadiene, cis- and trans-2-methyl-1,3-pentadiene, cis- and trans-3-methyl-1,3-pentadiene, 4-methyl-1,3-pentadiene, 2,4-dimethyl-1,3-pentadiene, and the like, and the mixture thereof. In preferred embodiments, isoprene or 1,3-butadiene or mixture thereof is used as the shell monomer.

The crosslinked core of the nanoparticles is typically produced from mono-vinyl aromatic monomers cross-linked with multiple-vinyl aromatic monomers. The weight ratio between the mono-vinyl aromatic monomers and multiple-vinyl aromatic monomers may broadly range from about 95:5 to about 0:100, from about 90:10 to about 25:75, or from about 85:15 to about 60:40.

Compounds that comprise a conjugated vinyl group and a conjugated aromatic group may be used as the mono-vinyl aromatic monomer. Suitable mono-vinyl aromatic monomers include, but are not limited to styrene, ethylvinylbenzene, (X-methyl-styrene, 1-vinyl naphthalene, 2-vinyl naphthalene, vinyl toluene, methoxystyrene, t-butoxystyrene, and the like; as well as alkyl, cycloalkyl, aryl, alkaryl, and aralkyl derivatives thereof in which the total number of carbon atoms in the monomer is generally not greater than about 18; and mixtures thereof. In exemplified embodiments, the mono-vinyl aromatic monomer comprises styrene.

Any compound that comprises two or more conjugated vinyl groups and a conjugated aromatic group may be used as the multiple-vinyl aromatic monomer. Suitable multiple-vinyl aromatic monomers include, but are not limited to compounds with a general formula as shown below:

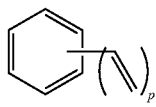

in which p is an integer and $2 \leq p \leq 6$, preferably, p is 2 or 3, more preferably p is 2, i.e. di-vinyl-benzene (DVB).

The DVB may be selected from any one of the following isomers or any combination thereof:

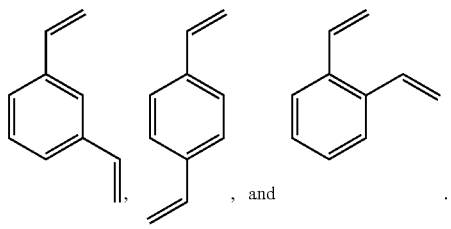

, and .

The polymer nanoparticle synthesized in the one-batch methods described herein may take the shape of nano-spheres. The mean diameter of the spheres may be broadly within the range of from about 1 to about 200 nm, within the range of from about 5 nm to about 100 nm, within the range of from about 10 nm to about 80 nm, or within the range of from about 15 nm to about 70 nm.

The average molecular weight Mn of the poly(conjugated diene) block of the shell portion may be controlled within the range of from about 5,000 to about 500,000, or within the range of from about 5,000 to about 200,000, and most preferably within the range of from about 10,000 to about 100,000. The average molecular weight Mn of the uncrosslinked aromatic block may be controlled within the range of from about 5,000 to about 500,000, within the range of from about 5,000 to about 200,000, or within the range of from about 10,000 to about 100,000.

The number average molecular weight (Mn) of the entire polymer nano-particle may be controlled within the range of from about 10,000 to about 10,000,000, within the range of from about 50,000 to about 1,000,000, or within the range of from about 100,000 to about 500,000. The polydispersity (the ratio of the weight average molecular weight to the number average molecular weight) of the polymer nano-particle may be controlled within the range of from about 1 to about 1.5, within the range of from about 1 to about 1.3, or within the range of from about 1 to about 1.2.

The Mn may be determined by GPC with a polystyrene standard. The Mn values used in the examples below were measured by GPC methods calibrated with linear polymers.

In one example, the core of the synthesized nanoparticles is relatively hard. That is, the core has a Tg of about 60° C. or higher. In another example, the nanoparticles have a core that is relatively harder than the shell, for example, at least about 60° C. higher than the Tg of the shell layer. In one example, the shell layer is soft. That is, the shell layer has a Tg lower than about 0° C. Preferably, the Tg of the shell layer is between about 0° C. and about −70° C. Nanoparticles with hard cores and soft shells are particularly useful for reinforcing rubber compounds used for tire treads.

As known by those of skill in the art, the Tg of the polymers can be controlled by the selection of monomers and their molecular weight, styrene content, and vinyl content.

An illustrative composition comprising a liquid polymer/nanoparticle blend also includes (a) a rubber matrix, (b) an optional oil, and (c) one or more components selected from the group consisting of carbon black, silica, vulcanizing agent, vulcanization accelerator, tackifier resin, antioxidant, fatty acids, zinc oxide, wax, peptizer, vulcanization retarder, activator, processing additive, plasticizer, pigments, and antiozonant. Various rubber products such as tires and power belts may be manufactured based on this composition.

The nanoparticle and liquid polymer blend may be compounded with rubber by methods generally known in the rubber compounding art, such as mixing the rubbery matrix polymer and the nanoparticle/liquid polymer blend with conventional amounts of various commonly used additive materials, using standard rubber mixing equipment and procedures.

A vulcanized rubber product may be produced from the composition of the present invention by thermomechanically mixing the liquid polymer nanoparticle blend, a rubbery matrix polymer, and conventional amounts of various commonly used additive materials in a sequentially step-wise manner in a rubber mixer, followed by shaping and curing the composition. Rubber articles such as tires may be manufactured from the composition made with the liquid polymer/nanoparticle blend described supra. Reference for this purpose may be made to, for example, U.S. Publication No. 2004/0143064 A1, which is hereby incorporated by reference.

A rubbery matrix that the nanoparticle liquid polymer blend is used in may comprise any solution polymerizable or emulsion polymerizable elastomer, for example, diene homopolymers, and copolymers and terpolymers of conjugated diene monomers with vinyl aromatic monomers and trienes such as myrcene. Exemplary diene homopolymers are those prepared from diolefin monomers having from 4 to about 12 carbon atoms. Exemplary vinyl aromatic polymers are those prepared from monomers having from 8 to about 20 carbon atoms. Examples of such monomers may be referred to the monomers for the polymer nanoparticle formation as described supra. In certain exemplary embodiments, the conjugated diene monomer and vinyl aromatic monomer are normally used at the weight ratios of about 1:99 to about 99:1, or about 15:85 to about 85:15. The rubbery matrix can have 1,2-microstructure contents ranging from about 1 percent to about 99 percent, or polymers, copolymers or terpolymers having 1,2-microstructure content of from about 1 to 99 percent, based upon the diene content of the rubbery matrix. The copolymers are preferably random copolymers which result from simultaneous copolymerization of the monomers with randomizing agents, as is known in the art.

The rubber matrix may comprise any conventionally employed treadstock rubber such as natural rubber, synthetic rubber and blends thereof. Such rubbers are well known to those skilled in the art and include synthetic polyisoprene rubber, styrene-butadiene rubber (SBR), styrene-isoprene-butadiene rubber, styrene-isoprene rubber, butadiene-isoprene rubber, polybutadiene, butyl rubber, neoprene, ethylene-propylene rubber, ethylene-propylene-diene rubber (EPDM), acrylonitrile-butadiene rubber (NBR), silicone rubber, the fluoroelastomers, ethylene acrylic rubber, ethylene vinyl acetate copolymer (EVA), epichlorohydrin rubbers, chlorinated polyethylene rubbers, chlorosulfonated polyethylene rubbers, hydrogenated nitrile rubber, tetrafluoroethylene-propylene rubber, and the like, and the mixture thereof.

The amount of initiator employed will vary with the desired molecular weight of the rubbery matrix polymer being synthesized. Higher molecular weights are achieved by utilizing smaller quantities of the initiator and lower molecular weights are attained by employing larger quantities of the initiator. The molecular weight of the rubbery polymer produced is, of course, also dependent upon the amount of chain transfer agent, such as t-dodecyl mercaptan, present during the polymerization. For instance, low molecular weight rubbery polymers can be synthesized by simply increasing the level of chain transfer agent.

Oil has been conventionally used as a compounding aid in rubber compositions. Examples of oil include, but are not limited to, aromatic, naphthenic, and/or paraffinic processing oils. In some examples, it may be preferable to use low-polycyclic-aromatic (PCA) oils, particularly oils that have a PCA content of less than 3%. In a variety of exemplary embodiments, the liquid polymer portion of the blend described above is used along with the oil, is used to replace a portion of the oil, or is used to replace the entirety of the oil in a rubber compound. As such, a typical amount of oil may broadly range from about 0 phr to about 100 phr, from about 0 phr to about 70 phr, or from about greater than 0 phr to about 50 phr, based on 100 phr rubbery matrix in the rubber composition.

As a skilled artisan can appreciate, reinforcement of a rubber product may be reflected by a low strain dynamic modulus G', as can be measured according to ASTM-D 412 at 22° C. In a variety of exemplary embodiments, reinforcement of rubber products such as tires made from the composition of the present invention may be achieved by (i) incorporation of the liquid polymer/nanoparticle blend; (ii) partially replacing the oil with the liquid polymer/nanoparticle blend; or (iii) entirely replacing the oil with the liquid polymer/nanoparticle blend.

The nanoparticle/liquid polymer blend provides various rubber products with improved reinforcement and controllable hysteresis. By controllable hysteresis, it is meant that the hysteresis is increased or decreased, or remains roughly unchanged, comparing to the situation where oil is present in the composition, but no liquid polymer and no polymer nanoparticles are included in the composition. For example, G'(MPa) may be increased at least about 0.3, preferably at least about 1.5, and more preferably at least 3.0.

The energy loss of an elastomer is termed hysteresis, which refers to the difference between the energy applied to deform an article made from the elastomer and the energy released as the elastomer returns to its initial and undeformed state. Hysteresis is characterized by a loss tangent, tangent delta (tan δ), which is a ratio of the loss modulus to the storage modulus (i.e., the viscous modulus to the elastic modulus) as measured under an imposed sinusoidal deformation. The tan δ value can be measured, for example, with a TA Instrument AIRES Rheometer.

Rubber products with improved reinforcement and suitable hysteresis may be manufactured with the nanoparticle/liquid polymer blend, in which the phr ratio between the component (a) liquid polymer and component (b) polymer nanoparticles is within the range of from about 1:99 to about 99:1, preferably within the range of from about 20:80 to about 80:20, more preferably within the range of from about 25:75 to about 40:60.

The illustrative rubber compositions described herein can be used for various purposes. For example, they can be used for various rubber compounds, such as a tire treadstock, sidewall stock or other tire component stock compounds. Such tires can be built, shaped, molded and cured by various methods that are known and will be readily apparent to those having skill in the art. In an embodiment, a molded unvulcanized tire is charged into a vulcanizing mold and then vulcanized to produce a tire, based on the composition and the procedure as described above.

The following examples are included to provide additional guidance to those skilled in the art in practicing the claimed invention. The examples provided are merely representative of the work that contributes to the teaching of the present application. Accordingly, these examples are not intended to limit the invention, as defined in the appended claims, in any manner.

EXAMPLES

Preparation of Nanoparticle and Liquid Polymer Blend

A two-gallon jacketed reactor was used as the reaction vessel. The following ingredients were used: 19.3% butadiene in hexane, 33% styrene in hexane, hexane, n-butyl lithium (1.6 M), oligomeric oxalanyl propane (1.6 M) (OOPs), isopropanol, butylated hydroxytoluene (BHT), and 80% divinylbenzene (DVB) purchased from Aldrich.

The reactor was sequentially charged with 4.96 lbs of hexane, 0.59 lbs of 33% styrene, and 3.58 lbs of 19.3% butadiene. This batch was heated to 120° F. over about 15 minutes. When the batch reached 117° F., 2.3 mL of n-butyl lithium (1.6 M) and 0.76 mL of OOPs (1.6 M), diluted with about 20 mL of hexane were added. The polymerization exothermed at 126.7° F. after three minutes of reaction. After one hour, the jacket of the reactor was set to 100° F. and 0.14 mL of isopropanol was added. After dropping a sample for analysis, some additional n-butyl lithium (2.3 mL) was added to the reactor. A mixture of 140.2 g styrene blend and 28.5 mL of DVB was prepared in a bottle and added to the reactor. The jacket temperature of the reactor was increased to 180° F. After three hours of reaction, the temperature was brought down to 90° F. and the mixture was dropped in isopropanol containing BHT. The resulting solid was then filtered through cheesecloth and drum dried.

The liquid polymer portion was determined to have an Mw of 73000 to 80000. The nanoparticle portion was determined to have a Mw of 83,700. The synthesized blend contained 55 wt % the liquid polymer and 45 wt % the nanoparticles, as determined by GPC.

The nanoparticle/liquid polymer blend was much easier to isolate from solvent and dry than previously known methods of separately synthesizing the liquid polymer. Coagulated liquid polymer is very difficult to separate from the solvent, the solvent must be carefully dropped out and it cannot easily be drum-dried. It may even be necessary to use a vacuum-oven to dry it, while being careful not to let the liquid polymer flow over. However, with a sufficent amount of nanoparticles in the liquid polymer blend, it produces a chunk of polymer after coagulation, which can be drum-dried very easily.

Preparation and Analysis of Example Rubber Compounds

Three rubber compositions were prepared according to the formulation shown in Tables 1 and 2. The first example was a control that contained no nanoparticles or liquid polymer to serve as a comparison with the test compounds. The second example was made using synthesized nanoparticles to replace 10 phr of styrene-butadiene rubber (SBR) in the compound formulation. The third example was made using nanoparticles and liquid polymer to replace 10 phr of SBR and about 15 phr of aromatic oil. Because the synthesized MNP/LP blend contained 55 wt % of the liquid polymer and 45 wt % of the nanoparticles, 22.2 phr of the MNP/LP blend and 2.8 phr of additional LP were used in the formulation in order to correctly match the desired composition.

To illustrate that the additional amount of LP is not a necessary component of the examples described herein, a fourth prophetic example is also presented. In the prophetic example 4, 25 phr of 40:60 MNP/LP blend is used. This prophetic example replaces the 10 phr of SBR with 10 phr of blended MNP and replaces the 15 phr of LP with 15 phr of blended LP without using additional LP by itself.

TABLE 1

Composition of Example Master Batches (in phr)

|  | Example 1 (Control) | Example 2 | Example 3 | Prophetic Example 4 |
|---|---|---|---|---|
| SBR[1] | 100 | 90 | 90 | 90 |
| Carbon Black (N343) | 50 | 50 | 50 | 50 |
| Aromatic Oil | 15 | 15 | 0 | 0 |
| Zinc Oxide | 3.0 | 3.0 | 3.0 | 3.0 |
| Hydrocarbon Resin (tackifiers) | 2.0 | 2.0 | 2.0 | 2.0 |
| Santoflex 13 (antioxidants) | 0.95 | 0.95 | 0.95 | 0.95 |
| Stearic Acid | 2.0 | 2.0 | 2.0 | 2.0 |
| Wax | 1.0 | 1.0 | 1.0 | 1.0 |
| Nanoparticles (100 wt % MNP) | 0 | 10 | 0 | 0 |
| Liquid Polymer/Nanoparticle[2] | 0 | 0 | 22.2 | 0 |
| Liquid Polymer/Nanoparticle[3] | 0 | 0 | 0 | 25 |
| Liquid Polymer | 0 | 0 | 2.8 | 0 |

[1]Trade Name HX263 from Firestone Polymers (Mw of 261 kg/mol, Mw/Mn of 2.30, 23.8% styrene by weight, 35% cis 1,4, 52% trans 1,4, and 13% 1,2 vinyl)
[2]45% nanoparticles and 55% liquid polymer
[3]40% nanoparticles and 60% liquid polymer

TABLE 2

Additional Additives to Final Batch Composition (in phr)

| Sulfur | ~1.3 | ~1.3 | ~1.3 |
|---|---|---|---|
| Cyclohexyl-benzothiazole sulfenamide (accelerator) | 1.4 | 1.4 | 1.4 |
| Diphenylguanidine (accelerator) | 0.20 | 0.20 | 0.20 |

In each example, a blend of the ingredients was kneaded by the method listed in Table 3. The final stock was sheeted and molded at 165° C. for 15 minutes.

TABLE 3

Mixing Conditions

Mixer: 300 g Brabender
Agitation Speed: 60 rpm
Master Batch Stage

| Initial Temperature | 110° C. |
|---|---|
| 0 min | charging polymers |
| 0.5 min | charging oil and Carbon Black |
| 5.0 min | drop sample for analysis |

Final Batch Stage

| Initial Temperature | 75° C. |
|---|---|
| 0 min | charging master stock |
| 0.5 min | charging curing agent and accelerators |
| 1.25 min | Drop sample for analysis |

TABLE 4

Analysis of Examples

|  | Example 1 (control) | Example 2 | Example 3 |
|---|---|---|---|
| Ring Tensile Strength |  |  |  |
| Tensile Break Stress 23° C. Tb (MPa) | 16.14 | 19.03 | 20.76 |
| Elongation at Break (Eb %) | 483.4 | 507 | 452.4 |
| 300% Modulus (M300) | 8.03 | 9.1 | 11.61 |
| 50% Modulus (M50) | 0.98 | 1.12 | 1.41 |
| Tg of Compound (extropolated from tan δ) | −45° C. | −43° C. | −40° C. |
| Rolling Resistance |  |  |  |
| tan δ 50° C. | 0.207 | 0.227 | 0.202 |
| G'(Pa × 10$^{-6}$) | 3.779 | 5.089 | 5.880 |

Measurement of the tensile strength and hysteresis loss were taken of the example vulcanized rubber compositions. The results are shown in Table 4. Measurement of tensile strength was performed according ASTM-D 412 at 22° C. The test specimen geometry was in the form of a ring of a width of 0.05 inches and of a thickness of 0.075 inches. The specimen was tested at a specific gauge length of 1.0 inch. Hysteresis loss was measured with a Dynastat Viscoelastic Analyzer set at a frequency of 1 Hz and 1% strain. The geometry of the specimen for this test was a cylinder of a length of 15 mm and a diameter of 10 mm.

While the invention has been illustrated and described in typical embodiments, it is not intended to be limited to the details shown, since various modifications and substitutions can be made without departing in any way from the spirit of the present invention. As such, further modifications and equivalents of the invention herein disclosed may occur to persons skilled in the art using no more than routine experimentation, and all such modifications and equivalents are believed to be within the spirit and scope of the invention as defined by the following claims.

What is claimed is:

1. A method for preparing a one-batch synthesized blend of nanoparticles and liquid polymer in a solvent, the method comprising the steps of:

(a) in a reaction vessel, polymerizing either a first monomer to form the liquid polymer, or copolymerizing the first monomer and a second monomer to form the liquid polymer;
(b) partially terminating the polymerization with a quenching agent; and
(c) adding a multiple-vinyl aromatic monomer, a mono-vinyl aromatic monomer, and an optional charge of polymerization initiator;
whereby nanoparticles are formed in situ and said nanoparticles have a core including the mono-vinyl aromatic monomer and a shell comprising the first monomer or the first and the second monomer.

2. The method of claim 1, wherein the quenching agent partially terminates the polymerization so that 20 to 95% of the polymers are terminated.

3. The method of claim 1, further comprising the step of filtering and drum drying the one-batch synthesized blend of nanoparticles and liquid polymer.

4. The method of claim 1, wherein the second monomer is selected from the group consisting of styrene, α-methyl styrene, 1-vinyl naphthalene, 2-vinyl naphthalene, 1-α-methyl vinyl naphthalene, 2-α-methyl vinyl naphthalene, vinyl toluene, methoxystyrene, t-butoxystyrene, and alkyl, cycloalkyl, aryl, alkaryl, and aralkyl derivatives thereof in which the total number of carbon atoms in the derivative is not greater than 18, or any di- or tri-substituted aromatic hydrocarbons, and mixtures thereof.

5. The method of claim 1, wherein the first monomer is a conjugated diene.

6. The method of claim 5, wherein the first monomer is selected from the group consisting of $C_4$-$C_8$ conjugated dienes and mixtures thereof.

7. The method of claim 1, wherein the nanoparticles are crosslinked with the multiple-vinyl aromatic monomer.

8. The method of claim 1, wherein the multiple-vinyl aromatic monomer is selected from the group consisting of compounds with a general formula of:

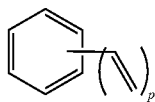

in which p is an integer and $2 \leq p \leq 6$.

9. The method of claim 6, wherein the multiple-vinyl aromatic monomer is divinylbenzene.

10. The method of claim 1, wherein the first monomer is butadiene and the second monomer is styrene.

11. The method of claim 1, wherein the core of the nanoparticle has a Tg of about 60° C. or higher.

12. The method of claim 1, wherein the shell of the nanoparticle has a Tg lower than about 0° C.

13. The method of claim 1, wherein the shell of the nanoparticle has a Tg between about 0° C. and about −70° C.

14. The method of claim 1, wherein the core of the nanoparticle has a Tg of at least about 60° C. higher than the Tg of the shell.

15. The method of claim 1, wherein the liquid polymer has an Mw of about 10,000 to about 120,000.

16. The method of claim 1, wherein the nanoparticles are formed by micelle self-assembly.

17. The method of claim 15, wherein the nanoparticles have a core comprising styrene cross-linked with divinylbenzene and a shell comprising butadiene.

18. The method of claim 1, wherein the multiple-vinyl aromatic monomer is added before the polymerization initiator and mono-vinyl aromatic monomer.

19. The method of claim 1, wherein the quenching agent is selected from the group consisting of methanol, ethanol, propanol, and isopropanol.

20. The method of claim 1, wherein the quenching agent is a functionalizing agent.

21. The method of claim 20, wherein the functionalizing agent is tin tetrachloride.

22. The method of claim 1, wherein the polymerizing or copolymerizing of step (a) are initiated with an anionic initiator.

23. The method of claim 1, wherein the steps are performed in the same reaction vessel.

24. A method for making a rubber composition, the method comprising:
making the blend of nanoparticles and liquid polymer according to claim 1; and
adding the blend to a rubber composition.

25. A method for making a tire with nanoparticles and liquid polymer, the method comprising:
making a blend of nanoparticles and liquid polymer according to claim 1;
adding the blend to a rubber composition;
molding the rubber composition into a tire tread; and
constructing a tire using the tire tread.

* * * * *